United States Patent
Kito et al.

(10) Patent No.: US 8,281,157 B2
(45) Date of Patent: Oct. 2, 2012

(54) STORAGE SYSTEM, CONTROL METHOD THEREFOR, AND PROGRAM

(75) Inventors: Daisuke Kito, Machida (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 473 days.

(21) Appl. No.: 12/527,665

(22) PCT Filed: Apr. 22, 2009

(86) PCT No.: PCT/JP2009/001830
§ 371 (c)(1),
(2), (4) Date: Aug. 18, 2009

(87) PCT Pub. No.: WO2010/122600
PCT Pub. Date: Oct. 28, 2010

(65) Prior Publication Data
US 2011/0185192 A1 Jul. 28, 2011

(51) Int. Cl.
G06F 21/00 (2006.01)
(52) U.S. Cl. .......................... 713/193; 726/16
(58) Field of Classification Search ............ 713/193
See application file for complete search history.

(56) References Cited

U.S. PATENT DOCUMENTS

| | | | |
|---|---|---|---|
| 7,882,303 B2 * | 2/2011 | Ueoka et al. | 711/112 |
| 2007/0168598 A1 | 7/2007 | Yamamoto et al. | |
| 2007/0180239 A1 | 8/2007 | Fujibayashi et al. | |
| 2008/0240429 A1 | 10/2008 | Kito et al. | |
| 2008/0240434 A1 * | 10/2008 | Kitamura | 380/255 |
| 2008/0260159 A1 * | 10/2008 | Osaki | 380/277 |
| 2008/0263368 A1 * | 10/2008 | Mikami et al. | 713/193 |

FOREIGN PATENT DOCUMENTS

| | | |
|---|---|---|
| EP | 1 975 838 A2 | 10/2008 |
| JP | 2005-011277 A | 1/2005 |
| JP | 2007-028502 A | 2/2007 |
| JP | 2008-250393 A | 10/2008 |

* cited by examiner

*Primary Examiner* — Jung Kim
*Assistant Examiner* — Ghodrat Jamshidi
(74) *Attorney, Agent, or Firm* — Foley & Lardner LLP

(57) ABSTRACT

It is made possible to correctly decrypt data in a storage area in a computer system (storage system) having various encryption execution sections (such as a storage device or encryption appliance having an encryption function). In the case where storage areas may be encrypted by the various encryption execution sections, there is a possibility that, when a storage area is copied or the configuration of the computer system is changed, the storage area cannot be correctly decrypted unless it is managed where the storage area has been encrypted or whether the storage area is not encrypted. To prevent this, a management computer manages the key and the encryption execution section for each storage area in the system. Furthermore, when copying a storage area or the like is performed, the management computer determines which storage area's state and key should be changed together with performing the copy operation is performed, and instructs the encryption execution section to change the state and key for the storage area if it is necessary to change it.

15 Claims, 21 Drawing Sheets

FIG. 2
(a)
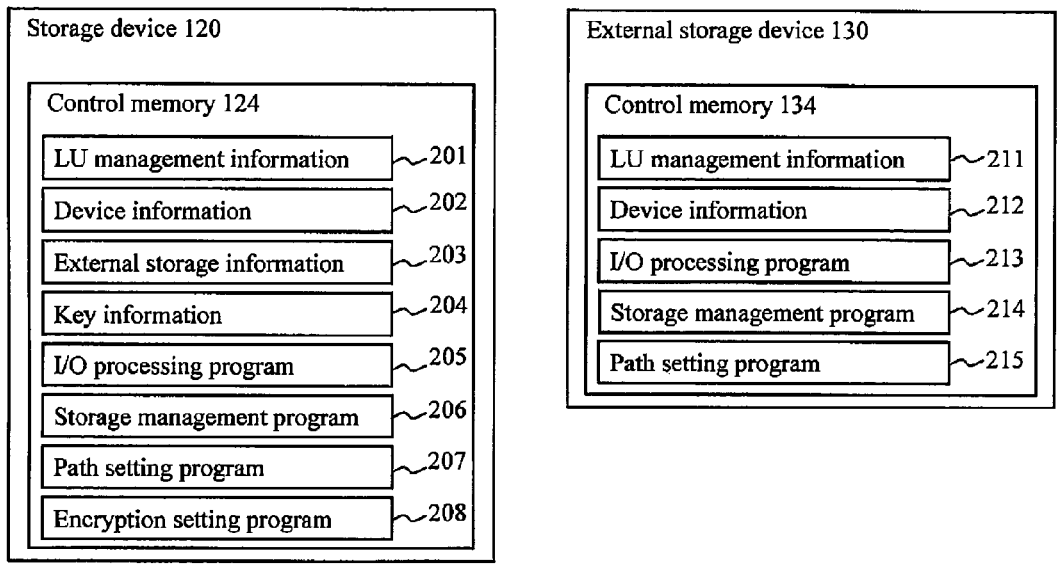
(b)
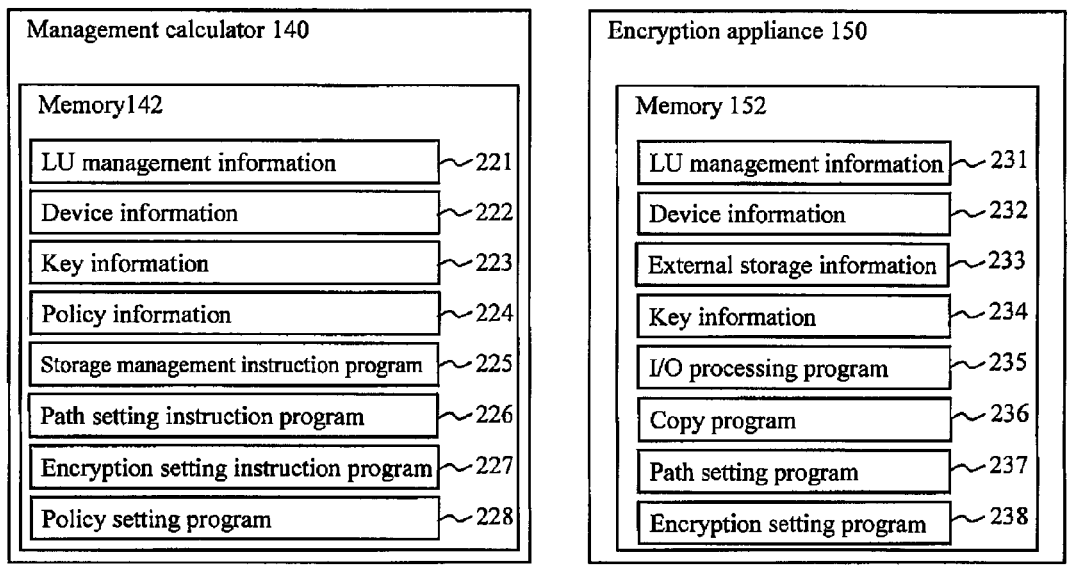

| Port (WWN) | LU number (LUN) | Capacity | Calculator permitted to access (WWN) | State (Ciphertext/Plaintext) | Key ID | Virtual LU/Actual LU | Related LU | Kind |
|---|---|---|---|---|---|---|---|---|
| a1 (FF:00:00:00: 00:00:00:FF) | 000 | 100GB | h1(10:00:00:00: 00:00:00:70) | Ciphertext | 1 | Actual | | |
| | 001 | 100GB | h1(10:00:00:00: 00:00:00:70) | Ciphertext | 1 | Actual | 001 | Pair-S |
| | 002 | 100GB | h1(10:00:00:00: 00:00:00:70) | Ciphertext | 1 | Virtual | D600- b1-1 | External connection |
| ... | ... | ... | ... | ... | ... | ... | ... | ... |

(b)

~211

| Port (WWN) | LU number (LUN) | Capacity | Calculator permitted to access (WWN) | Related LU | Kind |
|---|---|---|---|---|---|
| b1 (00:00:00:00 : FF:FF:FF:FF) | 1 | 100GB | h1(10:00:00:00: 00:00:70) | | |
| | 2 | 100GB | h1(10:00:00:00: 00:00:70) | | |
| | 3 | 100GB | | | |
| ... | ... | ... | ... | ... | ... |

FIG. 4

| 401 | 402 | 403 |
|---|---|---|
| Device name | Address | Encryption function |
| a100 | 10.1.1.1 | Not provided |

FIG. 5

| 501 | 502 | 503 | 504 | 505 |
|---|---|---|---|---|
| Port (WWN) | LU number | External storage device | Port (WWN) | LU number in external storage device |
| a1 (FF:00:00:00: 00:00:00:FF) | 002 | D600 | b1 (00:00:00:00: FF:FF:FF:FF) | 1 |
| | 004 | D700 | b2 (00:00:00:00: AA:AA:AA:AA) | 5 |
| | 010 | D800 | b3 (00:00:00:00: BB:BB:BB:BB) | 1 |
| ... | ... | ... | ... | ... |

FIG. 6

| 601 | 602 | 603 | 604 |
|---|---|---|---|
| Key ID | Key data | Key length | Algorithm |
| 1 | O35tuobdg5j6ki··· | 256 | AES-ECB |
| 2 | 0000011111··· | 128 | AES-CBC |
| ... | ... | ... | ... |

FIG. 7

| Port (WWN) | LU number (LUN) | Capacity | Calculator permitted to access (WWN) | State (Ciphertext/ Plaintext) | Key ID | Related LU | Kind |
|---|---|---|---|---|---|---|---|
| 701 | 702 | 703 | 704 | 705 | 706 | 707 | 708 |
| p1 (PP:PP:PP:PP: 00:00:00:00) | 000 | 100GB | h1(10:00:00:00:00: 00:00:70) | Ciphertext | 1 | | |
| | 001 | 100GB | h1(10:00:00:00:00: 00:00:70) | Ciphertext | 2 | | |
| | 002 | 100GB | | Ciphertext | 3 | D600-b11-10 | External connection |
| ... | ... | ... | ... | ... | ... | ... | ... |

FIG. 8

| Key ID | Key data | Key length | Algorithm |
|---|---|---|---|
| 1 | 052pgrmkg3jp9··· | 128 | AES-ECB |
| 2 | 65p54m13lp5kl··· | 256 | AES-XTS |
| ... | ... | ... | ... |

| Device name | Address | Encryption function |
|---|---|---|
| AP10 | 10.10.10.10 | Provided |

| Port (WWN) | LU number | External storage device | Port (WWN) | LU number in external storage device |
|---|---|---|---|---|
| p1 (PP:PP:PP:PP :00:00:00:00) | 000 | D600 | b11 (11:11:11:11: AA:AA:AA:AA) | 10 |
| | 001 | D700 | b22 (22:22:22:22: AA:AA:AA:AA) | 1 |
| | 002 | D800 | b33 (11:11:11:11: BB:BB:BB:BB) | 1 |
| ... | ... | ... | ... | ... |

| 1001 | 1002 | 1003 | 1004 | 1005 | 1006 | 1007 | 1008 | 1009 | 1010 | 1011 |
|---|---|---|---|---|---|---|---|---|---|---|
| Device name | Port (WWN) | LU number (LUN) | Capacity | Calculator permitted to access (WWN) | State (Ciphertext/ Plaintext) | Key ID | Virtual LU/ Actual LU | Encryption part | Related LU | Kind |
| A100 | a1 | 000 | 100GB | h1 | Plaintext | | Actual | | | |
| | | 001 | 100GB | h1 | Plaintext | | Actual | | 001 | Pair-S |
| | | 002 | 100GB | h1 | Ciphertext | 1 | Virtual | Device itself | D600-b1-1 | External connection |
| | ... | ... | ... | ... | ... | ... | ... | ... | ... | ... |
| D600 | b1 | 1 | 100GB | a1 | Ciphertext | A100-1 | Actual | Upper | 2 | Pair-S |
| | | 2 | 100GB | a1 | Ciphertext | A200-1 | Actual | Upper | | |
| | b11 | 10 | 100GB | p1 | Ciphertext | AP10-1 | Actual | Upper | | |
| | ... | ... | ... | ... | ... | ... | ... | ... | ... | ... |
| AP10 | p1 | 000 | 100GB | | Ciphertext | 3 | Virtual | Device itself | D600-b11-10 | External connection |
| | ... | ... | ... | ... | ... | ... | ... | ... | ... | ... |
| A200 | a2 | 000 | 100GB | h1 | Ciphertext | 1 | Virtual | Device itself | D600-b1-2 | External connection |
| | ... | ... | ... | ... | ... | ... | ... | ... | ... | ... |
| ... | | | | | | | | | | |

FIG. 12

| Device name | Address | Encryption function |
|---|---|---|
| A100 | 10.1.1.1 | Provided |
| D600 | 10.10.10.10 | Not provided |
| AP10 | 10.2.2.2 | Provided |
| ... | ... | ... |

| Device name | Key ID | Key data | Key length | Algorithm |
|---|---|---|---|---|
| A100 | 1 | O35tuobdg5j6ki··· | 256 | AES-ECB |
|  | 2 | 0000011111··· | 128 | AES-CBC |
|  | ... | ... | ... | ... |
| AP10 | 1 | 052pgrmkg3jp9··· | 128 | AES-ECB |
|  | 2 | 65p54m13lp5kl··· | 256 | AES-XTS |
|  | ... | ... | ... | ... |
| ... | ... | ... | ... | ... |

| Device name | Policy |
|---|---|
| A100 | Attaching importance to security |
| A200 | Attaching importance to performance |
| ... | ... |

1301, 1302

STORAGE SYSTEM, CONTROL METHOD THEREFOR, AND PROGRAM

TECHNICAL FIELD

The present invention relates to a storage system, a control method therefor and a program, for example, to an encryption key management technique in the case of encrypting data in a storage device.

BACKGROUND ART

Recently, with the spread of storage area networks (SAN's) which connect storage devices, computers and management computers via an exclusive line like Fiber Channel (FC), computer systems are becoming large-scaled. There has been developed a technique for efficiently managing the data of the computer system, which is increasingly swelling. For example, in Patent Citation 1, a technique is disclosed in which a first storage device is connected to one or more second storage devices (also referred to as external storage devices), the storage areas of the second storage devices are virtualized as if they were storage areas of the first storage device, and the virtualized storage areas are provided for a computer (a storage virtualization technique).

With the increase in information leakage caused by a theft of a disk or the like, secure storage and management of data are attracting growing interest. For example, in Patent Citation 2, a storage device is provided with a function of encrypting a storage area and is capable of encrypting data to be read from or written into the storage area. According to the technique of Patent Citation 2, it is possible to prevent leakage of data even in the case of being affected by a theft of a disk or the like.

Furthermore, for example, in Patent Citation 3, it is thought to construct a more secure computer system by a upper storage device which has an encryption function encrypting the data of a lower storage device which does not have an encryption function.

CITATION LIST

Patent Literature
[PTL 1] JP Patent Publication (Kokai) No. 2005-011277
[PTL 2] JP Patent Publication (Kokai) No. 2007-28502
[PTL 3] JP Patent Publication (Kokai) No. 2008-250393

SUMMARY OF INVENTION

Technical Problem

However, in the system as shown in Patent Citation 3, that is, in a system in which a upper storage device virtualizes a storage area of a lower storage device (an external storage device) as a storage area of the upper storage device, and further encrypts the virtualized storage area, it is conceivable that the situation as shown below occurs.

For example, it is now assumed that the upper storage device virtualizes a first storage area of the external storage device as a first virtual storage area of the upper storage device, and virtualizes a second storage area of the external storage device as a second virtual storage area of the upper storage device. It is assumed that the upper storage device then encrypts the first virtual storage area using a first key, and encrypts the second virtual storage area using the second key. The virtual storage area is a storage area which is virtual. Actually, data is not written into the virtual storage area, and the data is actually written into a storage area of the external storage device. For example, when data is written into the first virtual storage area from a computer, the upper storage device encrypts the data with the first key, and writes the encrypted data into the first storage area of the external storage device. On the contrary, when data is read from the first virtual storage area by the computer, the upper storage device decrypts the data in the first storage area of the external storage device with the first key, and provides the decrypted data for the computer.

In this environment, an administrator can use a storage management function provided for the external storage device. For example, the administrator uses a copy function (a function of copying data from the first storage area of the external storage device to the second storage area) of the external storage device. In this case, the data in the first storage area, that is, the data encrypted with the first key for the upper storage device is stored into the second storage area of the external storage device.

On the other hand, when reading the data in the second storage area of the external storage device, the upper storage device attempts to decrypt the data with the second key. Since data encrypted with the first key has been stored in the second storage area by the copying described above, there is caused a problem that the upper storage device cannot correctly decrypt the data in the second storage area.

Furthermore, in the case where the configuration of the computer system is complicated, there is a possibility that, when the encryption key for a certain storage area is changed or deleted, data cannot be correctly decrypted unless the encryption keys of the other storage areas are also changed or deleted. For example, it is assumed that the first storage area of the external storage device has been copied to a third storage area, and the third storage area has been virtualized and encrypted as a third virtual storage area at a upper storage device (second storage device) different from the above-described upper storage device (the first storage device) (for example, in the example of FIG. 11, an LU 002 of a port a1 of a device A100 has been obtained by virtualizing an LU 1 of a port b1 of a device D600. The data in the LU 1 of D600 has been copied to an LU 2 of D600. The LU 2 has been virtualized and encrypted as an LU 000 of a port a2 of a device A200 different from A100.) In this case, if the key used for encryption of the first virtual storage area is changed from the first key to a different key in the first storage device, data encrypted not with the first key but with the different key is stored in the first storage area. Similarly, in the third storage area to which the first storage area is copied, data encrypted not with the first key but with the different is stored. Therefore, when a second storage device reads the data in the third storage area, it cannot correctly decrypt the data unless it uses not the first key but the different key. That is, the second storage device cannot correctly decrypt the data in the third storage area unless it changes the key for encryption of the third virtual storage area from the first key to the different key (for example, in the example of FIG. 11, if the key ID of the key for the LU 002 of the port a1 of the device A100 is changed from 1 to 2, A200 cannot correctly decrypt the data in the LU 2 of D600 unless the key for the LU 000 of the port a2 of the device A200 is also changed to be the same value of the key with the key ID of 2). However, since the first storage device itself cannot grasp how the data in the first storage area is used by other upper storage devices, it is not possible for the first storage device to solve the problem by itself.

When the data in a storage area of the external storage device has been encrypted by the key for the upper storage device, and the data in the storage area is copied to a different storage area by the copy function of the external storage device, there is a problem that, even if it is attempted to read the data in the copy-destination storage area later, the data cannot correctly decrypted because it is not known which encryption key should be used, unless the encryption key for the copy-destination storage area is also managed.

If it is not grasped where the data in the storage areas of the external storage device have been encrypted, for example, whether the data has been encrypted with the use of the encryption function of the upper storage device, or whether the data has been encrypted at an encryption-function-equipped HDD in the external storage device or at a different place (such as an encryption appliance product), there is a possibility that the data in a storage area of the external storage device cannot be correctly decrypted in the case of changing the system configuration, for example, in the case of newly virtualizing a storage area of the external storage device or in the case of connecting the external storage device to a different upper storage device.

The above problems may also occur in the case where an encryption appliance product, an FC switch or the like which is equipped with an encryption function has encrypted data of the external storage device, in addition to the case where the upper storage device encrypts the data of the external storage device.

The present invention has been made in view of such a situation and provides a technique capable of, in a computer system (storage system) in which the data in a storage area of an external storage device is encrypted by a upper storage device, an encryption appliance product or the like, correctly decrypting the data in a storage area of the external storage device even in the case where the data in the storage area of the external storage device is copied or in the case where the configuration of the computer system is changed (in the case where a upper storage device is added and virtualization is performed).

Solution to Problem

In order to solve the above problems, a storage system according to the present invention is provided with a storage device (120), an encryption/decryption processing section (205, 150), and a management computer (140). Here, the storage device (120) includes multiple storage areas (125) for storing data. The encryption/decryption processing section (205, 150) encrypts data stored in the storage areas (125) and decrypts the encrypted data. The management computer (140) manages the operations of the storage device (120) and the encryption/decryption processing section (205, 150). In such a system, the management computer (140) manages management information (221) which includes state information indicating whether stored data is encrypted or not and information about a key to be used for encryption of data to be stored, for each of the multiple storage areas (125). The storage device (120) has a copy processing section (206) for copying the data in a first storage area to a second storage area. Before the copy function by the copy processing section (206) is set, the encryption/decryption processing section (205, 150) encrypts and decrypts the data stored in the first storage area with a first encryption key, and encrypts and decrypts the data stored in the second storage area with a second encryption key. On the other hand, if the copy function by the copy processing section (206) is set, the management computer (140) updates the encryption key information in the management information (221) about the second storage area, from the second encryption key to the first encryption key, and instructs the encryption/decryption processing section (205, 150) to decrypt the data copied to the second storage area with the first encryption key. The encryption/decryption processing section (205, 150) may be in the storage device (120), or it may be separately provided outside the storage device (120) like an encryption appliance (150).

The storage system has the property to enable virtualization of a storage area. In this case, virtualization may be realized by preparing an external storage device (130) separately from the storage device (120), or it is also possible that an encryption appliance having the above encryption/decryption processing section is prepared so that a virtual storage area virtualizing storage area of the storage device (120) may be set in the encryption appliance.

When it is instructed to set a new encryption key for a storage area, the management computer (140) updates the management information (221) about the target storage area. At the same time, if there is a virtualized storage area and/or a lower storage area of the target storage area, the management computer (140) updates the management information (221) about the storage area as necessary, and instructs the encryption/decryption processing section (205, 150) to perform encryption and decryption on the basis of the updated management information.

Furthermore, when processing a request to set a path between a storage area and a host computer (100), the management computer (140) executes setting of the path if the path setting requirement is such that data provided for the host computer (100) is plaintext data.

When associating a virtualized storage area with a target storage area based on the request for virtualization, the management computer (140) determines whether or not plaintext data is outputted from the target storage area. If plaintext data is outputted, it is determined whether or not to reflect the encryption key for the target storage area to the virtualized storage area, depending on whether or not the state of the target storage area is the ciphertext state. On the other hand, if encrypted data is outputted from the target storage area, the management computer (140) further determines whether or not the device which the virtualized storage area belongs to has an encryption function. If the device does not have an encryption function, the path between the virtualized storage area and the host computer (100) is deleted. If the device has an encryption function, the encryption execution part (a place where encryption is executed, which is also called as encryption part) for the virtualized area is set to "device itself" (the virtualized storage area concerned), and the encryption execution part for the target storage area is set to "upper" (the virtualized storage area) in the management information (221).

The management computer (140) further manages information about whether an encryption key for a storage area can be taken out or not, in the management information (221). If execution of copying processing of data in a storage area for which the encryption key cannot be taken out is instructed, the management computer (140) notifies the storage device (120) or the encryption appliance (150) which performs encryption of the data in the storage area for which the encryption key cannot be taken out, of alternative key information indicating which encryption key used to encrypt which data in which storage area, among different storage areas, the encryption key used to encrypt the data in the storage area of the copy destination is the same as. The storage device (120) or the encryption appliance (150) executes encryption and decryption processing of the data in the storage area of the copy destination on the basis of the alternative key information.

The management computer (140) further manages policy information (224) indicating whether the storage device (120) takes priority to security or performance. When receiving a request for virtualization and associating a virtualized storage area with a target storage area, the management computer (140) may refer to the policy information (224) to realize virtualization.

Further characteristics of the present invention will be apparent from best embodiments for carrying out the invention below and accompanying drawings.

Advantageous Effects of Invention

According to the present invention, it becomes possible to correctly decrypt an encrypted storage area by an encryption execution section managing encryption keys appropriately, even if encryption of data in a storage device is performed at various places (such as software on a computer, an FC switch, a controller of the storage device and an encryption-function-equipped HDD). For example, in a system in which an storage area of an external storage device is encrypted, it becomes possible to, even if data in the storage area is copied or the encryption key for the storage area is changed, correctly decrypt data in the storage area and storage areas related to the storage area.

BRIEF DESCRIPTION OF DRAWINGS

FIG. 2 is a diagram showing an example of the software configurations of a storage device 120, an external storage device 130, a management computer 140 and an encryption appliance 150.

FIG. 3 is a diagram showing examples of LU management information 201 and 211.

FIG. 4 is a diagram showing an example of device information 202 about the storage device 120.

FIG. 5 is a diagram showing an example of external storage information 203 of the storage device 120.

FIG. 6 is a diagram showing an example of key information 204 of the storage device 120.

FIG. 7 is a diagram showing an example of LU management information 231 of the encryption appliance 150.

FIG. 8 is a diagram showing an example of key information 234 of the encryption appliance 150.

FIG. 9 is a diagram showing an example of device information 232 about the encryption appliance 150.

FIG. 10 is a diagram showing an example of external storage information 233 of the encryption appliance 150.

FIG. 11 is a diagram showing an example of LU management information 221 of the management computer 140.

FIG. 12 is a diagram showing an example of device information 222 of the management computer 140.

FIG. 13 is a diagram showing an example of key information 223 of the management computer 140.

FIG. 14 is a diagram showing an example of policy information 224 of the management computer 140.

DESCRIPTION OF EMBODIMENTS

The present invention provides a technique for, in the case where the state of a storage area changes (such as in the case where encrypted data is copied from a different storage area and stored, in the case where the storage area is associated with a virtualized storage area, and in the case where the storage area itself is encrypted), causing data encryption processing and decryption processing in the storage area to be appropriately executed.

Best embodiments for carrying out the present invention will be described below with reference to accompanying drawings. However, it should be understood that the embodiments are only examples for realizing the present invention and do not limit the technical scope of the present invention. Components common to the drawings are given the same reference numbers.

Figure 1:
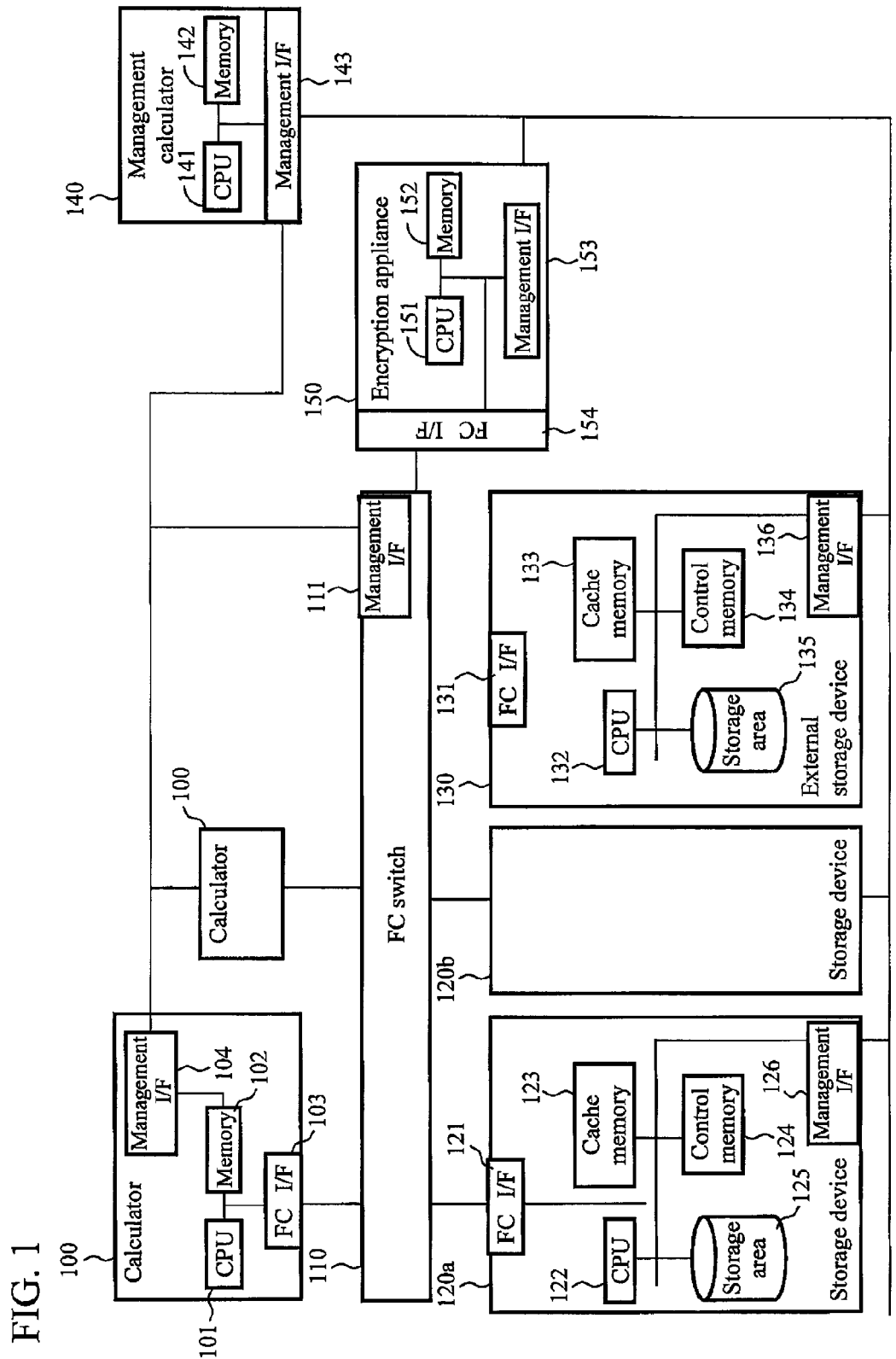
FIG. 1 is a diagram showing a schematic configuration example of a system (storage system) according to the present invention.

(1) First Embodiment
<System Configuration>
FIG. 1 is a diagram showing a schematic configuration example of a computer system (storage system) according to the present invention.

The computer system is provided with one or more computers (host computers) 100, a fiber channel switch (hereinafter referred to an FC switch) 110, storage devices 120a and 120b (referred to as storage devices 120 in general), an external storage device 130, a management computer 140 and an encryption appliance 150.

Each of the computers 100, the storage devices 120 and 130 and the encryption appliance 150 is connected to the FC switch 110 via FC interfaces (hereinafter FC I/F's) 103, 121, 131 and 154. Each of the FC switch 110, the storage device 120, the external storage device 130 and the encryption appliance is connected to the management computer 140 via management I/F's 111, 126, 136 and 153 and through an IP network and managed by the management computer 140.

The computer 100 has a CPU 101 and a memory 102. In the memory 102, programs executed by the CPU 101 and data read from and written into the storage device 120 is held. The computer 100 has one or more FC I/F's 103 connected to the FC switch 110 and one or more management I/F's 104 connected to the management computer 140 via the IP network.

The storage device 120 has one or more FC I/F's 121 connected to the FC switch 110, a CPU 122, a cache memory 123, a control memory 124, a storage area 125 and a management I/F 126. The CPU 122 of the storage device 120 receives a data reading/writing request from the computer 100 via the FC I/F 121, and reads or writes the requested data from or into the storage area 125. The storage area 125 is a logical device managed by the CPU 122, being associated with a physical device such as a disk device. The computer 100 recognizes this storage area 125 and requests reading or writing of data from the storage device 120. The storage device 120 is provided with a virtualization function (which is realized by 206 in FIG. 2*a*), and is capable of virtualizing a storage area 135 of the external storage device 130 as a storage area 125 of the storage device 120 itself. When receiving a request to read or write data from or into this virtualized storage area 125 (also referred to as a virtualized area), from the computer 100, the storage device 120 actually reads or writes the data from or into the storage area 135 of the external storage device 130.

The CPU 122 of the storage device 120 receives a request for a management operation of the storage device 120, from the management computer 140 via the management I/F 126, and executes a predetermined management operation. For example, the CPU 122 executes an operation of copying the data in a storage area to a different storage area or the like. The CPU 122 transmits the result of the management operation, configuration information about the storage device 120 and the like to the management computer 140.

In the cache memory 123, data received from the computer 100 or data frequently read from the storage area 125 are stored.

In the control memory 124, configuration information about the storage area 125 (for example, the capacity of the storage area 125, whether the storage area 125 is encrypted or plaintext) and information about an encryption key and the like are stored. The storage device 120 is provided with a data encryption/decryption function (to be realized by 208 in FIG. 2*a*), and data is written or read after being encrypted or decrypted for a storage area in the encrypted state.

The external storage device 130 has one or more FC I/F's 131 connected to the FC switch 110, a CPU 132, a cache memory 133, a control memory 134, a storage area 135 and a management I/F 136. The CPU 132 of the storage device 130 receives a read/write request from the computer 100 or the storage device 120 via the FC I/F 131 and reads or writes the requested data from or into the storage area 135. The CPU 132 also receives a request for a management operation of the external storage device 130, from the management computer 140 via the management I/F 136, and executes a predetermined management operation. The external storage device 130 is not limited to the configuration shown in this embodiment. A storage device having a different function, performance or configuration, for example, such as a storage device provided with a data encryption/decryption function and a storage device provided with a virtualization function, is also possible.

The management computer 140 has a CPU 141, a memory 142, a management I/F 143 connected to the computer 100 and the FC switch 110 via the IP network. The management computer 140 loads programs for management of the storage devices and the computers, which are recorded in a non-volatile recording medium such as a magnetic disk device not shown, onto the memory 142 at the time of activation of the management computer 140 or the like. By executing the loaded programs, the CPU 141 can perform acquisition of the configuration information about the storage devices 120 and the external storage device 130, detection of a fault, monitoring of the performance and the like. By using the management computer 140, an administrator can perform management operation of the whole computer system. The medium for recording the programs may be a storage medium other than a magnetic disk device (such as a CD-ROM and a floppy disk). Furthermore, the programs may be loaded onto the management computer 140 from the storage medium and executed or may be loaded from a different storage medium via a network.

The encryption appliance 150 has an FC I/F 154 connected to the FC switch 110, a CPU 151, a memory 152 and a management I/F 153 connected to the management computer 140 via the I/P network. The CPU 151 of the encryption appliance 150 receives a request to read/write data, from the computers 100 via the FC I/F 154, and reads or writes the requested data from or into the storage area 125 or 135 after encrypting the requested data or immediately in a state of plaintext. The CPU 151 receives a request for an encryption management operation from the management computer 140 via the management I/F 153, and executes a specified management operation. In the case where the storage devices have an encryption function, the encryption appliance is not necessary for the system configuration.

<Software Configuration of Storage Device 120 (Various Information and Programs>

Next, the software configurations of the storage device 120, the external storage device 130, the management computer 140 and the encryption appliance 150 in this embodiment will be described. FIG. 2 is a diagram showing examples of these software configurations.

In the control memory 124 of the storage device 120, there are stored management information for configuration management of the storage device 120, such as the identifier and the capacity of the storage area 125, device information such as the name of the storage device, and program information such as a program for reading/writing of data, a program for setting encryption and the like. These pieces of information will be described below.

In the control memory 124, there are stored storage area (hereinafter referred to as LU: Logical Unit) management information 201 (LU management information: LU management information of the storage device), external storage information 203, device information 202 and key information 204.

i) LU Management Information

First, the LU management information 201 (example) will be described with the use of FIG. 3. The LU management information 201 is configured, for example, by nine data items of an item 301 to an item 309. Under the item 301, port numbers of the storage device 120 are stored. The port number is assigned to each port of the storage device 120, and it is a value which can be uniquely identified. The storage device 120 is capable of defining an LU for each port, and the computer 100 accesses the LU from the port. The storage device 120 can have multiple ports.

Under the item 302, an LU number for identifying each LU is stored. The LU number can be defined for each port, and the computer 100 specifies an access destination using a port and an LU number. Under the item 303, the capacity of each LU is stored. Under the item 304, identification information about a computer 100 permitted to access each LU is stored. For example, the value of a WWN (World Wide Name) assigned to the port of the computer 100 is stored.

Under the item 305, information indicating the state (whether encrypted or plaintext) of each LU is stored. Under the item 306, key ID's are stored. The key ID is an ID for identifying an encryption key used for encryption of the LU, and it is a value which can be uniquely identified in the storage device 120. When the LU is not encrypted, the value for this item is not defined. This key ID is the same as a key ID 601 to be described later, and detailed information about an encryption key can be acquired with this ID.

Under the item 307, information indicating whether each LU is an LU using a physical device in the storage device 120 (an actual LU: data is stored in the LU itself) or an LU obtained by virtualizing an LU in the external storage device 130 (a virtual LU: data is stored in a lower LU) is stored.

Under the item 308, information about an LU related to each LU is stored. For example, if the storage device 120 has a copy function, and the data in the LU 1 is copied to an LU 2, then "LU 2" is written under the item 308 for the LU 1. The copy function is a function of copying data in a certain LU and storing the copied data into a different LU. The same data is stored in the copy source and the copy destination. In this embodiment, a copy-source LU may be called a P of pair (or a pair-P) and a copy-destination LU may be called an S of pair (or a pair-S). Creating the P of pair and the S of pair in such a copy relationship is also referred to as creating a copy pair. In the case of copying is performed between the storage devices 120, for example, in the case of copying the data in an LU of the storage device 120a to an LU of the storage device 120b, this is called remote copying.

Under the item 309, information indicating the kind of each related LU 308 is stored. For example, if the related LU is "an S of pair", then information "S of pair" is stored. If the related LU is in an external storage device, information "external connection" is stored.

ii) Device Information

Next, the device information 202 (example) will be described with the use of FIG. 4. The device information 202 about the storage device is configured by three data items of an item 401 to an item 403. Under the item 401, the device name of the storage device 120 is stored. Under the item 402, an IP address or a host name for identifying the storage device 120, which is provided for the management I/F of the storage device 120, is stored. Under the item 403, information indicating whether or not the storage device 120 is equipped with an encryption function is stored. In the case of a computer system configured by one or more storage devices 120 and external storage devices 130, the storage devices 120 and the external storage devices 130 can be uniquely identified by this device information.

iii) External Storage Information

Furthermore, the external storage information 203 (example) will be described with the use of FIG. 5. The external storage information 203 is configured by five data items of an item 501 to an item 505.

Under the item 501, port numbers of the storage device 120 are stored. Under the item 502, the LU number of a virtual LU defined for each port of the storage device 120 is stored. Under the item 503, external storage device information for uniquely identifying each external storage device 130 is stored.

Under the item 504, the port number of the external storage device is stored indicating which port of the external storage device a virtual LU of the storage device 120 is associated with. When a request to access a virtual LU of the storage device 120 is given from the computer 100, the storage device 120 specifies this port number and an LU number 505 defined for the port to access the LU in the external storage device 130.

Under the item 505, the number of an LU in the external storage device which corresponds to each virtual LU of the storage device 120 is stored. The storage device 120 virtualizes the LU of the external storage device 130 as a virtual LU of the storage device 120 and provides it for the computer 100. The LU number is an LU number defined in the external storage device 130. The storage device 120 may virtualize not only an LU of the external storage device 130 but also an LU of a different storage device 120.

The storage device 120 manages the above three pieces of information (information of i to iii) as configuration information and uses them for configuration management of the storage device 120. The configuration information may be configured to include information other than the above information, for example, information indicating a copy-pair state.

iv) Encryption Key Management Information

The encryption key management information 204 (example) of the storage device 120 will be described with the use of FIG. 6. The encryption key management information 204 is configured by four data items of an item 601 to an item 604.

Under the item 601, a key ID for identifying each encryption key in the storage device 120 is stored. Under the item 602, encryption key data is stored. Under the item 603, a value indicating each key length is stored.

Under the item 604, algorithm information about each encryption key (for example, indicating that data is to be encrypted in the ECB mode of AES) is stored. In this embodiment, description will be made mainly on the case of setting an encryption key of the storage device 120 for each LU. The reason for using a different encryption key for each LU is: if the same encryption key is used for all the LU's, the encryption keys for all the other LU's are known when one encryption key is leaked, and it is not desirable from the viewpoint of security. However, the above form is not limiting. A form of using a common encryption key for multiple LU's or a form of using the same encryption key for all LU's in the storage device is also possible.

v) Program

Next, the program information of the storage device 120 will be described. The program information is configured by four programs described below. An I/O processing program 205 is executed in response to an instruction from the computer 100. A storage management program 206, a path setting program 207 and an encryption setting program 208 are executed in response to an instruction from the management computer 140. Each program functions as each processing section in cooperation with the CPU. That is, for example, the I/O processing program becomes an I/O processing section by cooperating with the CPU. The same is true of the other programs.

First, in response to a data reading/writing request from the computer 100, the I/O processing program 205 reads or writes data from or into a storage area of the storage device 120 or the external storage device 130. The storage management program 206 executes other functions which the storage device 120 is equipped with, for example, copying of a storage area, virtualization of a storage area of the external storage device 130 and the like.

The path setting program 207 sets a path between the storage device 120 and the computer 100. The encryption setting program 208 performs encryption setting for a storage area of the storage devices 120 or the external storage device 130. For example, if encryption setting for a storage area is enabled, an encryption key for the storage area is set, and after that, the I/O processing program encrypts/decrypts data from or to the computer 100 using the encryption key to write or read the data into or from the storage area. The above is the description of the software configuration of the storage device 120.

<Software Configuration of External Storage Device 130>

Next, the program configuration of the external storage device 130 will be described. In the control memory 134 of the external storage device 130, LU management information 211 for managing LU numbers and capacities in the external storage device, information about a computer which can access each LU, and device information 212 for identifying the external storage device 130 are stored, similarly to the storage device 120. The LU management information 211 of the external storage device 130 is configured by six data items of an item 311 to an item 316. Since the contents of each item is the same as the contents of each item of the LU management information 201 of the storage device 120, description thereof is omitted.

As program information, there are provided an I/O processing program 213 for processing a data reading/writing request from the computer 100 or the storage device 120, a storage management program 214 for executing a function (for example, copying of a storage area) of the external storage device in response to an instruction from the management computer 140, and a path setting program 215 for setting a path between the storage area 135 and the computer 100 or the storage device 120.

The software configuration of the external storage device 130 may be in the same form of the software configuration of the storage device 120. For example, the external storage device 130 may be in the form of having an encryption function and a virtualization function similarly to the storage device 120.

<Software Configuration of Management Computer 140>

The software configuration of the management computer 140 will be described. In the memory 142 of the management computer 140, there are stored LU management information 221 for managing the LU's in the storage device 120, the storage device 130 and the encryption appliance 150, device information 222 indicating device information about the storage device 120, the external storage device 130 and the encryption appliance 150, key information 223 indicating key information about the storage devices 120 and the encryption appliance 150, and policy information 224 indicating a policy (whether to attach importance to security or to attach importance to performance) to be applied to the storage device 120. These pieces of information will be described below.

i) LU Management Information

The LU management information 221 is configured by eleven data items of an item 1001 to an item 1011. Since the contents of items except the items 1001 and 1009, among these items, are the same as the contents of the items of the LU management information 201 of the storage device 120, description thereof is omitted.

Under the item 1001, the device names of the storage devices 120, the external storage device 130 and the encryption appliance 150 managed by the management computer 140 are stored.

Under the item 1009, information about a place where the data stored in each LU is encrypted is stored. For example, in the case of an LU for which "device itself" is set as the encryption execution part, it means that the device itself which holds the LU directly encrypts the data in the LU. For example, in the case of an LU for which "upper" is set as the encryption execution part, it means that encryption of data is performed in an LU upper than the LU, that is, in a virtual LU obtained by virtualizing the LU. Furthermore, in the case of an LU for which "lower" is set as the encryption execution part, it means that encryption of data is performed in an LU lower than the LU, that is, in an LU associated with the virtual LU (for example, in an LU in the external storage device 130). The storage device virtualizes an LU of a different storage device to create a virtual LU in the storage device itself. Hereinafter, the virtual LU may be called a upper LU, and the LU which is virtualized may be called a lower LU. As for such an LU in the encrypted state that its encryption execution part field is in blank (this is also expressed as "the encryption execution part field is empty"), it indicates that there is not a storage device or an encryption appliance which directly accesses the LU to encrypt data. For example, the case of copying the data in an LU 1 which has been encrypted by the encryption appliance 150 to an LU 2 of a different storage device and the case of creating a copy of an LU 1 of a first storage device into the LU 2 of a different storage device still in the encrypted state are included. Since the LU 2 is not encrypted directly by the encryption appliance 150 or the storage device, the encryption execution part field is empty. That is, information is not set in 1009 (1009 is in blank) unless encryption has been performed by a direct upper device or lower device. Therefore, there may be a case where the encryption execution part 1009 is shown in blank though the state 1006 is "ciphertext". In the case of plaintext, the encryption execution part 1009 is naturally shown in blank because encryption is not necessary.

The management computer 140 collects the LU management information from each of the storage devices 120, the storage device 130 and the encryption appliance 150, and creates the management information 221 on the basis of the information. The LU management information 221 of the management computer 140 is assumed to be updated in response to update of the LU management information of the storage device 120, the external storage device 130 and the encryption appliance.

ii) Device Information

The device information 222 is configured by three data items of items 1101, 1102 and 1103. Under the item 1101, the device names of the storage devices 120, the external storage device 130 and the encryption appliance 150 managed by the management computer 140 are stored. Other items are similar to the items of the device information 202 of the storage device 120.

iii) Key Information

The key information 223 is configured by five data items of items 1201 to 1205. Under the item 1201, the device names of the storage devices 120, the external storage device 130 and the encryption appliance 150 managed by the management computer 140 are stored. The details of information about the key for each device are defined under the items 1202, 1203, 1204 and 1205. The items 1202, 1203, 1204 and 1205 are similar to the items of the key information 204 of the storage device 120.

iv) Policy Information

The policy information 224 is configured by two data items of items 1301 and 1302. Under the item 1301, the device names of the storage devices 120 managed by the management computer 140 are stored. Under the item 1302, information about a policy to be applied to each storage device 120 is stored. For example, for a storage device for which "attaching importance to performance" is set, the management computer controls the storage device to virtualize an LU of a storage device which does not have an encryption function.

On the other hand, for a storage device for which "attaching importance to security" is set, the management computer controls the storage device to virtualize an LU of a storage device having an encryption function.

v) Program Information

Next, program information of the management computer 140 will be described. The program information is configured by the four programs below.

A storage management instruction program 225 instructs the storage device 120, the external storage device 130 or the encryption appliance 150 to execute a function related to storage management, for example, such as copying of a storage area. A path setting instruction program 226 instructs the storage device 120, the external storage device 130 or the encryption appliance 150 to execute setting of a path between a storage area and the computer 100 or setting of a path between a storage area and the encryption appliance 150 or the storage device 120. An encryption setting instruction program 227 instructs the storage device 120 or the encryption appliance 150 to set encryption, such as encryption of a storage area. A policy setting program 228 sets a policy (whether to attach importance to performance or to attach importance to security) to be applied to the storage device 120.

<Software Configuration of Encryption Appliance>

The software configuration of the encryption appliance 150 will be described. In the memory 152 of the encryption appliance 150, there are stored LU management information, such as the identifiers and the capacities of virtual LU's of the encryption appliance not shown, identification information about the encryption appliance and key information, and program information such as an encryption setting program. These pieces of information will be described below.

i) LU Management Information

The LU management information 231 (example) will be described with the use of FIG. 7. The LU management information 231 is configured by eight data items of an item 701 to an item 708. As for the items 701, 702, 703, 704, 705, 706, 707 and 708, the contents are similar to the contents of the items of the LU management information 201 of the storage device 120.

In the case of the encryption appliance 150, an LU for storing data does not actually exist in the encryption appliance 150. The LU of the encryption appliance 150 is a virtual LU obtained by virtually mapping an LU of the storage device as an LU of the encryption appliance 150. The encryption appliance 150 causes the computer 100 to recognize this virtual LU. When receiving a request to read or write data from or into the virtual LU from the computer 100 (in the case of processing an I/O request via the encryption appliance 150), the encryption appliance 150 reads or writes the data from or into an LU of the storage device associated with the virtual LU. The encryption appliance 150 reads or writes the data after decrypting or encrypting the data in the case where the virtual LU in the encryption appliance 150 is in the encrypted state, and immediately reads or writes the data in plaintext in the case where the virtual LU in the encryption appliance 150 is in the plaintext state.

ii) Device Information, Key Information and External Storage Information

The device information 232 is configured by three data items of items 901, 902 and 903. The key information 234 is configured by four data items of items 801, 802, 803 and 804. The external storage information 233 is configured by five data items of items 911, 912, 913, 914 and 915. The items of each information are similar to the items of the device information 202, the external storage information 203 and the key information 204 of the storage device 120.

Next, program information of the encryption appliance 150 will be described. The program information is configured by four programs described below. An I/O processing program 235 is executed in response to an instruction from the computer 100. A copy program 236, a path setting program 237 and an encryption setting program 238 are executed in response to an instruction from the management computer 140.

In response to a data reading/writing request from the computer 100, the I/O processing program 235 reads or writes data from or into an LU of the storage device 120 or the external storage device 130 which is associated with a virtual LU. The copy program 236 copies data in an LU of the encryption appliance 150 to a different LU of the encryption appliance 150. The path setting program 237 sets a path between the encryption appliance 150 and the computer 100.

The encryption setting program 238 performs encryption setting for an LU of the encryption appliance 150. For example, if encryption setting for an LU is enabled, an encryption key for the LU is set, and after that, the encryption appliance 150 encrypts/decrypts data from or to the computer 100 using the encryption key, and writes or reads the encrypted/decrypted data into or from an LU of the storage device associated with the LU of the encryption appliance 150.

<Concept of Storage Management (Simple Example)>

The details of a series of processings from encryption setting to storage management in this embodiment will be described below on the basis of the above software configuration.

Figure 15:
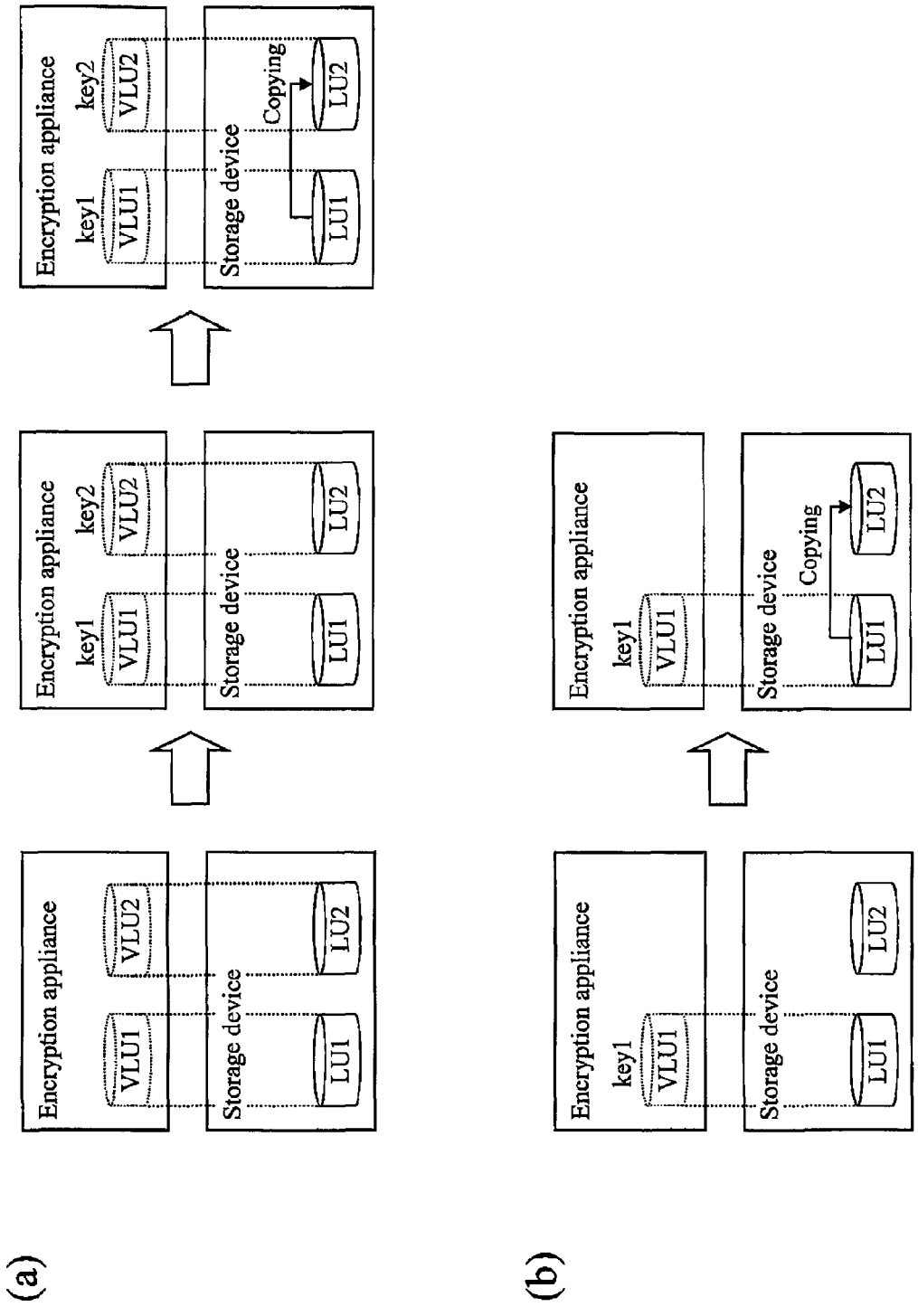
FIG. 15 is a diagram showing the outline of encryption and key management processings of a first embodiment.

First, LU encryption and copy processings of an LU and a method for managing key information about an LU and information about encryption will be described, with the simplest case shown in FIG. 15 as an example. FIG. 15 uses an example in which the encryption appliance 150 provides a virtual LU of the storage device.

As shown in FIG. 15, the encryption appliance 150 virtualizes LU's of a storage device. The encryption appliance 150 defines a virtual LU (VLU 1) obtained by virtualizing an LU 1 and a virtual LU (VLU 2) obtained by virtualizing an LU 2, in the encryption appliance 150. The encryption appliance 150 causes the computer 100 to recognize the virtual LU's, and the computer 100 requests the encryption appliance 150 to read or write data from or into the virtual LU's.

When receiving a request to write or read data into the VLU 1, the encryption appliance 150 encrypts the data and writes the encrypted data into the LU 1 if the VLU 1 is in the encrypted state, and immediately writes the data in the state of plaintext into the LU 1 if the VLU 1 is in the plaintext state. In FIG. 15(a), the VLU 1 and the VLU 2 are assumed to be in the plaintext state and the LU 1 and LU 2 are also assumed to be in the plaintext state, first. The management computer 140 manages information about the LU's of the encryption appliance 150 and the storage device. In this case, in the LU management information 221 of the management computer 140, "plaintext" is set under the item 1006 for VLU 1, "virtual" is set under the item 1008, "LU 1" is set under the item 1010, and "external connection" (which indicates the kind of the LU 1, and, in this case, indicates that the LU 1 is a lower LU associated with a virtual LU) is set under the item 1011. As for the item 1009, since data is not encrypted in the VLU 1, nothing is written (hereinafter, this may be expressed as "without encryption execution part").

When encryption is executed in the VLU 1 and VLU 2, a key 1 is set for the VLU 1, and a key 2 is set for the VLU 2. After that, the encryption appliance 150 encrypts or decrypts data to the VLU 1 or the VLU 2 using these keys to execute data reading/writing processing for the LU 1 and the LU 2. In this situation, "ciphertext" is set under the item 1006 for the VLU 1, "ID of key 1" is set under the item 1007, and "device itself" is set under the item 1009. The "device itself" of the item 1009 indicates that the data in the VLU 1 has been encrypted by the encryption function of the encryption appliance 150 itself. In this case, "ciphertext" is set under the item 1006 for the LU 1,and "key 1" is set under the item 1007, but "upper" is set under the item 1009. The "upper" of the item 1009 indicates that encryption of data has been performed in an LU upper than the LU 1, the VLU 1 obtained by virtualizing the LU 1 in this case.

Next, it is assumed that the data in the LU 1 is copied to the LU 2 with the use of the copy function of the storage device. Before the copying, data stored in the LU1 is encrypted with the key 1, and data stored in the LU2 is encrypted with the key 2. After the copying, not only the data encrypted with the key 2 but also the data encrypted with the key 1 is stored in the LU 2. However, since the encryption appliance 150 attempts to decrypt the data in the LU 2 with the key 2 (the key for the VLU 2), the data encrypted with the key 1 cannot be correctly decrypted. In order to correctly decrypt the data, it is necessary to change the key for the VLU 2 of the encryption appliance 150 from the key 2 to the key 1 when copying is performed. When copying is performed, the management computer 140 notifies the encryption appliance 150 to change the key or performs control such as prohibition of copying itself.

Furthermore, the case of FIG. 15(*b*) will be described. In the initial state, the LU 1 is virtualized into a VLU 1, and the state "ciphertext" and the key 1 are set for the VLU 1. The LU 2 is in the plaintext state. In this case, if the LU 1 is copied to the LU 2, data encrypted with the key 1 is stored in the LU 2. Therefore, "ciphertext" is set under the item 1006 for the LU 2, "ID of key 1" is set under the item 1007, and there is no description (blank) under the item 1009. It is because the LU 2 is not directly encrypted by the encryption appliance 150 but the data in the LU 1 is simply copied to the LU 2 that no description is shown under the item 1009 for the LU 2 though "upper" is set under the item 1009 for the LU 1. The above is the outline of the encryption and copying processing of an LU, and the method for managing information about LU's.

More detailed processing related to encryption setting, copying and the like in this embodiment will be described below. Description will be made below with the case wherein the storage device 120 encrypts an LU as an example. However, in the case where the encryption appliance 150 encrypts an LU, the contents of the processing are basically the same.

<Read/Write Processing in Storage Device>

Figure 16:
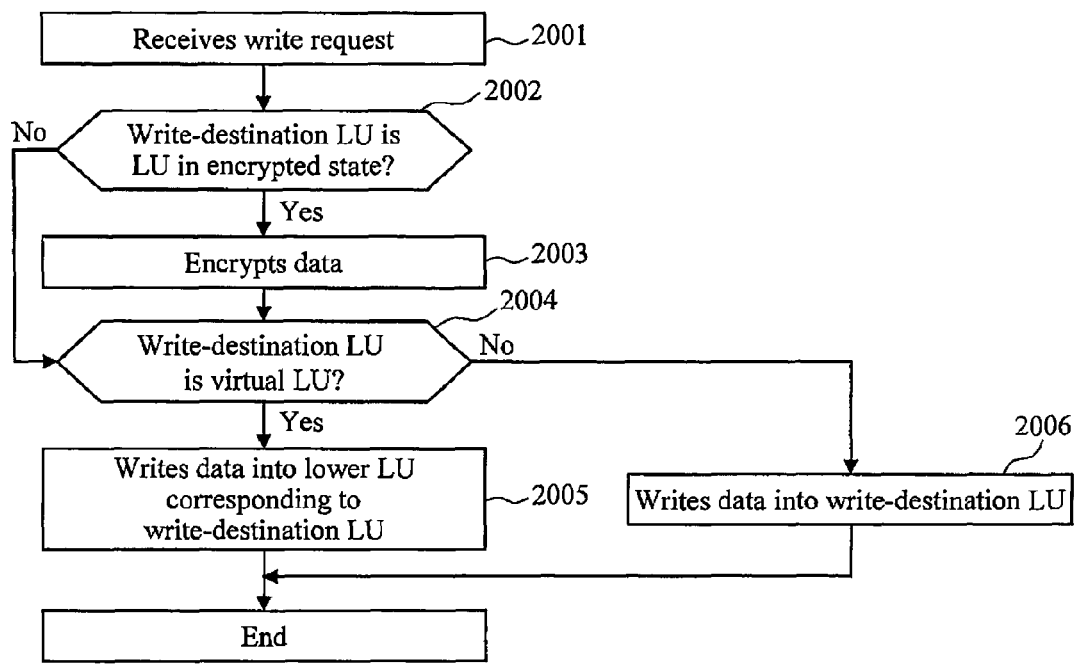
FIG. 16 is a diagram showing an example of a write processing flow of the storage device 120 according to the present invention.

First, read/write processing of data in the storage device 120 will be described.

i) FIG. 16 is a flowchart for illustrating the write processing executed by the I/O processing program 205 of the storage device 120.

The storage device 120 receives a request to write data into an LU of the storage device 120 from the computer 100 or via the encryption appliance 150 (step 2001). The I/O processing program 205 determines whether the write-destination LU is "ciphertext" or "plaintext" on the basis of the item 305 (state) (step 2002).

If the state of the write-destination LU is "ciphertext", the I/O processing program 205 of the storage device 120 performs encryption using the key of the item 306 (step 2003). If the state of the write-destination LU is not "ciphertext", the processing proceeds to step 2004. The details of the key to be used can be determined from the information under the item 601 to the item 604.

The I/O processing program 205 of the storage device 120 determines whether the write-destination LU is a virtual LU or not on the basis of the item 307 (step 2004). If the write-destination LU is a virtual LU, the I/O processing program 205 writes the data into a lower LU corresponding to the write-destination LU (step 2005). For example, in the example of FIG. 3, if the write-destination LU is the LU 002, it is known that the lower LU corresponding to the LU 002 is the LU 1 of the storage D600 from the contents of the items 308 and 309, and the storage device 120 writes the data into the LU 1 of D600.

If the write-destination LU is not a virtual LU, the I/O processing program 205 writes the data into the write-destination LU (step 2006).

Figure 17:
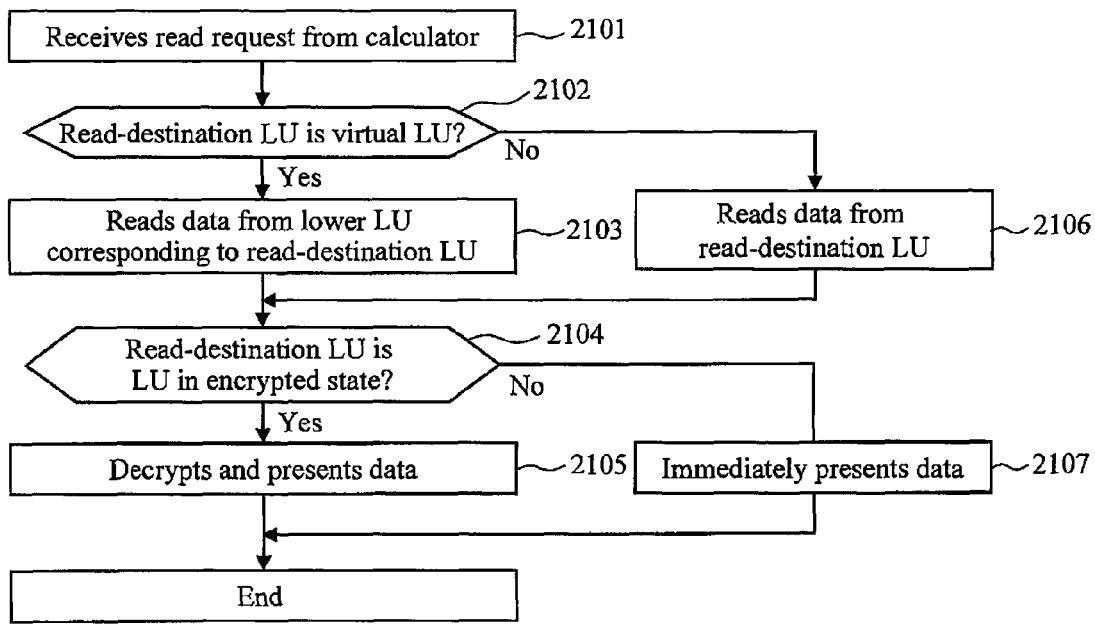
FIG. 17 is a diagram showing an example of a read processing flow of the storage device 120 according to the present invention.

The above is the write processing of data in the storage device 120.

ii) Next, the read processing by the storage device 120 will be described. FIG. 17 is a flowchart for illustrating the read processing executed by the I/O processing program 205 of the storage device 120.

The I/O processing program 205 of the storage device 120 receives a request to read data from an LU of the storage device 120, from the computer 100 or via the encryption appliance 150 (step 2101). The storage device 120 determines whether the read-destination LU is a virtual LU or not on the basis of the item 307 (step 2102).

If the read-destination LU is a virtual LU, the I/O processing program 205 reads the data from a lower LU corresponding to the read-destination LU (step 2103). If the read-destination LU is not a virtual LU, the I/O processing program 205 reads the data from the read-destination LU (step 2106).

Furthermore, the I/O processing program 205 determines whether the state of the read-destination LU is "ciphertext" or "plaintext" on the basis of the item 305 (state) (step 2104). If the read-destination LU is "ciphertext", the I/O processing program 205 of the storage device 120 decrypts the data using the key of the item 306, and the I/O processing program 205 presents the decrypted data to the computer 100 (step 2105).

On the other hand, if the read-destination LU is not "ciphertext", the I/O processing program 205 immediately presents the data as it is (step 2107).

The above is the read processing by the storage device 120.

<Processing for Creating Device Information of Management Computer>

Next, processing for creating the device information 222 of the management computer 140 will be described. The management computer 140 grasp what computers 100 and storage devices 120 exist in the system by performing transmission of broadcast packets into the network or the like. Then, the management computers 140 requests these computers 100 and storage devices 120 to send device information.

Receiving the request, the computers 100 and storage devices 120 transmit their device information (for example, the information shown in FIG. 4 in the case of the storage device 120) to the management computer 140. The management computer 140 registers the contents of the items 1101 to 1103 in FIG. 12 on the basis of the collected information.

In addition to this method, the form is also possible in which a user registers information about the computers 100 and the storage devices 120 individually with the table in FIG. 12.

<Processing for Management Computer 140 to Enable Encryption of LU of Storage Device>

Next, processing for the management computer 140 to enable encryption of an LU of the storage device 120 will be described.

Figure 18:
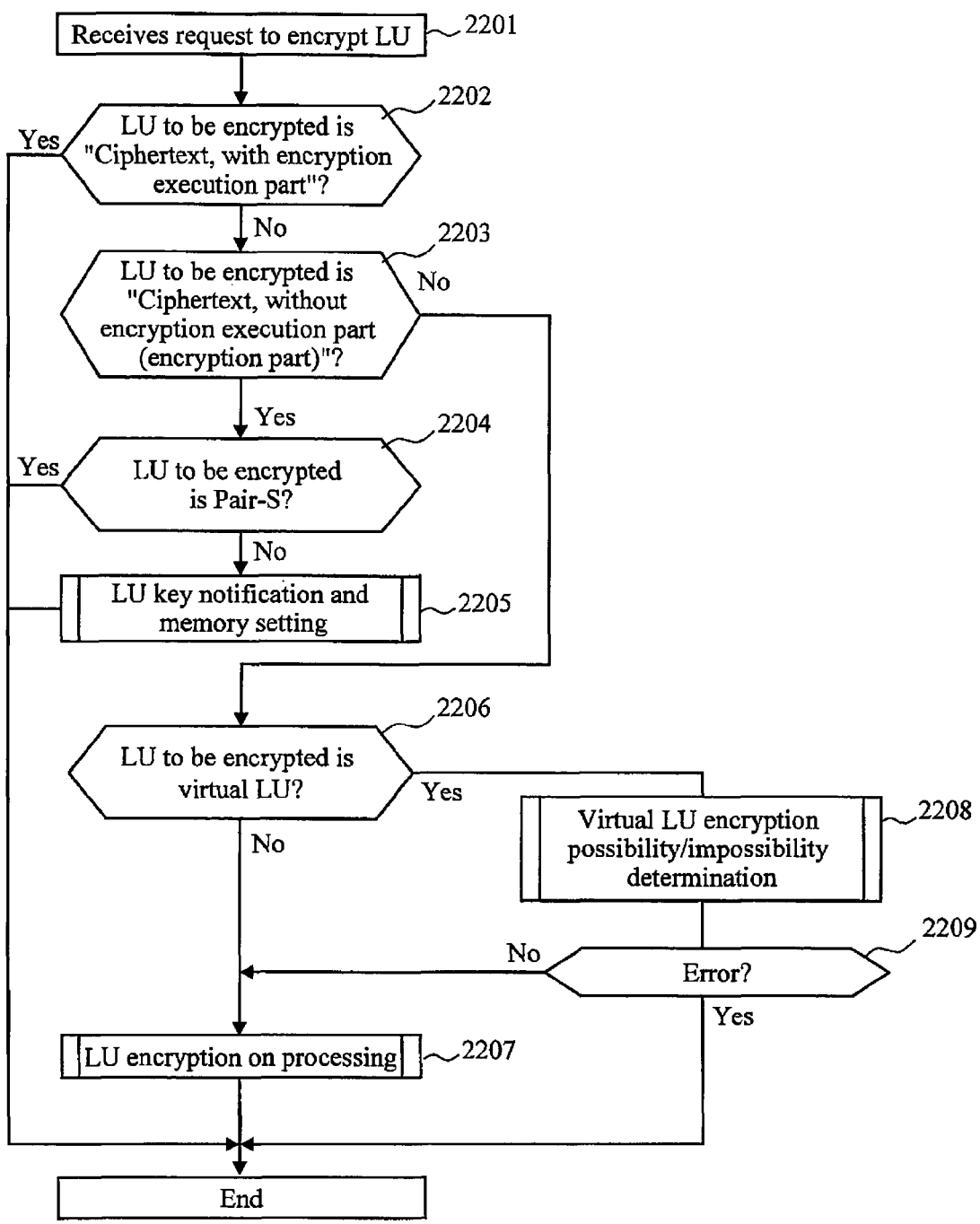
FIG. 18 is a flowchart for illustrating processing for the management computer 140 to enable encryption of an LU in the first embodiment.

FIG. 18 is a flowchart for illustrating the processing for enabling encryption of an LU of a storage device, which is executed by the encryption setting instruction program 227 of the management computer 140.

When the management computer 140 receives a request to encrypt a certain LU of the storage device 120 from a user (step 2201), the encryption setting instruction program 227 of the management computer 140 determines whether or not LU requested to be encrypted at step 2201 is ciphertext and the encryption execution part is set for the LU (the field of the item 1009 is not in blank) by referring to the items 1003, 1006 and 1009 in the LU management information 221 (step 2202). That is, at step 2202, it is determined whether or not, though the LU is an encrypted LU, the encryption of the LU is performed in the device itself or a upper or lower device. Processing for determining whether the storage device 120 or the encryption appliance 150 recognizes the LU which is encrypted is performed at step 2202.

If "ciphertext" and "encryption execution part" are set (step 2202: Yes), encryption processing for the LU is already enabled, the processing ends. Otherwise, (step 2202: No), the processing proceeds to step 2203. For example, in the example of FIG. 11, "ciphertext" and "encryption execution part" (device itself) are set for the LU 002 under a device name A100, and "plaintext" and "without encryption execution part" (the contents of the item 1009 is empty) are set for the LU 000 under the device name A100. Therefore, the processing ends in the former example, and the processing proceeds to step 2203 in the latter example.

The encryption setting instruction program 227 of the management computer 140 similarly determines whether "ciphertext" and "without encryption execution part" are set for the LU requested to be encrypted (step 2203). That is, it is determined whether or not, though the LU is an encrypted LU, the LU is directly encrypted by the storage device 120 or the encryption appliance 150.

If "ciphertext" and "without encryption execution part" are set (step 2203: Yes), the encryption setting instruction program 227 determines whether or not the LU requested to be encrypted is a pair-S by referring to the items 1010 and 1011 (step 2204). Specifically, it is checked whether the information of LU requested to be encrypted is written in the field of the item 1010, and the LU is determined not to be a pair-S if it is not written in the field. Even if the information of LU is written in the field of the item 1010, the LU is determined not to be a pair-S if the kind (item 1011) is not "pair-S". If there is an LU which is written in the field of the item 1010 and the kind (item 1011) of which is "pair-S", the LU is determined to be a pair-S. If the LU is a pair-S (step 2204: Yes), the processing ends. If the LU is not a pair-S (step 2204: No), the processing proceeds to step 2205. The reason why encryption is not performed in the case of an LU for which "ciphertext" and "without encryption execution part" are set and for which "pair-S" is set as the kind is that data of pair-P is being copied to pair-S in ciphertext and, therefore, it is not necessary to further encrypt the data (if encryption of the LU is performed, the data copied from pair-P is further encrypted).

On the other hand, as for an LU for which "ciphertext" and "without encryption execution part" are specified but which is not a pair-S (in the case of step 2204: No), the computer 100 cannot understand the data even if the data in the LU is provided for the computer 100 as it is, because the data is encrypted. Therefore, it is necessary not to encrypt the data in the LU again but to set a key for decrypting the data in the LU or encrypting data received from the computer 100, for the storage device 120, and set the storage device 120 to decrypt/encrypt the data in the LU using this key thereafter. This is performed at step 2205. The management computer 140 executes an LU key notification and memory setting function for notifying the storage device to set a key in the memory of the storage device (step 2205).

If the LU to be encrypted is in the plaintext state (step 2203: No), the management computer 140 determines whether the LU is a virtual LU or not by referring to the item 1008 (step 2206). If the LU is not a virtual LU, the management computer 140 executes an LU encryption On processing function and ends the processing (step 2207). If the LU is a virtual LU, the management computer 140 executes a virtual LU encryption possibility/impossibility determination function (step 2208). Then, the management computer 140 checks the execution result of the encryption possibility/impossibility determination function (determines whether the result is an error or not) (step 2209). If the result is an error, the management computer 140 ends the processing. If the result is not an error, the management computer 140 proceeds to step 2207 (step 2210).

The processing for enabling encryption of an LU has been described above. Next, the processing contents of each of the LU key notification and memory setting function, the virtual LU encryption possibility/impossibility determination function and the LU encryption On processing function will be described in detail. In these functions, a lower LU key setting function, a copy LU key setting function and a virtual LU key setting function are further used. These functions will be described later.

<LU Key Notification and Memory Setting Function>

Figure 19:
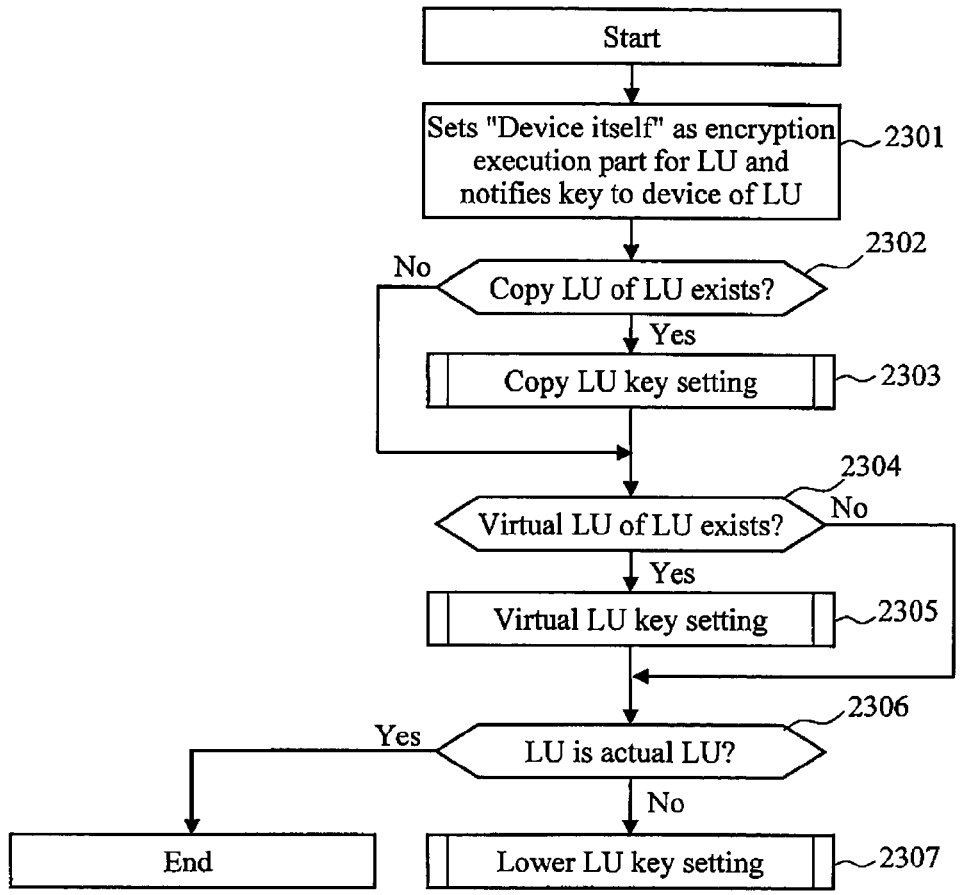
FIG. 19 is a flowchart for illustrating processing for the management computer 140 to execute a key notification/memory setting function in an LU the first embodiment.

FIG. 19 is a flowchart for illustrating processing by the LU key notification and memory setting function.

If having executed this function for a certain LU (a processing target LU), the management computer 140 changes the encryption execution part information for the LU from a blank state ("without encryption execution part") to "device itself" (update of the item 1009), and notifies the device of the LU (the device of the item 1001 which has the LU) to set the key of the item 1007 in the memory of the device of the LU (step 2301). The notified device, for example, the storage device 120 updates the LU management information 201 so that the notified key is used for encryption of the LU thereafter. Specifically, the storage device 120 adds the notified key to the item 601, and changes the key ID (item 306) of the LU to the ID of the notified key. It is conceivable to, when a key is handed over between the management computer 140 and the storage device 120 or the encryption appliance 150, transmit/receive the key after encrypting the communication path or encrypting the key itself by public-key cryptography or the like for improvement of security.

Next, the management computer 140 determines whether or not there is a copy LU (a copy-destination LU) of the LU (the processing target LU), that is, an LU to which the data in the LU has been copied (a pair-S) (step 2302). If the key or the encrypted/unencrypted state of the copy-source LU is changed, there is a case in which the key or the encrypted/unencrypted state of the copy-destination LU also need to be changed. With this in mind, it is determined whether or not the copy LU exists as described above.

If there is a copy LU (step 2302: Yes), the management computer 140 executes the copy LU key setting function to be described later (step 2303). The determination about whether there is a copy-LU or not is performed by referring to the items 1010 and 1011. When "pair-S" is set as the kind of a related LU of the LU, it is determined that there is a copy-LU. If "pair-S" is not set, it is determined that there is not a copy-LU.

If there is not a copy LU of the LU (step 2302: No), or after the copy LU key setting function is executed (step 2303), the management computer 140 determines whether or not there is a virtual LU of the LU (step 2304). If there is a virtual LU, the management computer 140 executes the virtual LU key setting function (step 2305). Thereby, the key for the virtual LU and the key for the LU are set to be the same.

If there is not a virtual LU (step 2304: No), or after virtual LU key setting is executed (step 2305), the management computer 140 determines whether the LU is an actual LU or not (step 2306). If the LU is an actual LU, the management computer 140 ends the processing. If the LU is not an actual LU, the management computer 140 executes the lower LU key setting function to be described later (step 2307).

The above is the description of the LU key notification and memory setting function. Next, the virtual LU encryption possibility/impossibility determination function will be described.

<Virtual LU Encryption Possibility/Impossibility Determination Function>

Figure 20:
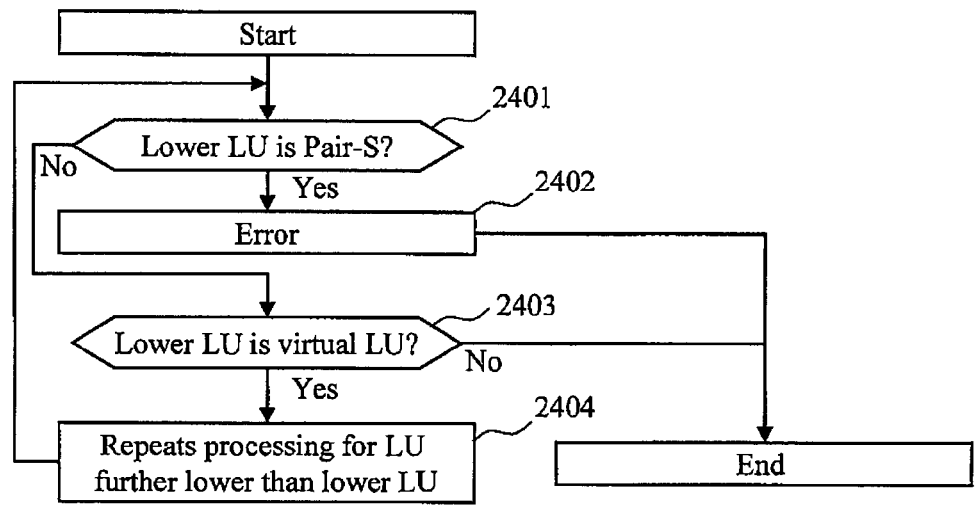
FIG. 20 is a flowchart for illustrating processing for the management computer 140 to execute a virtual LU encryption possibility/impossibility determination function in the first embodiment.

FIG. 20 is a flowchart for illustrating the processing contents of the virtual LU encryption possibility/impossibility determination function. If an LU to be encrypted is a virtual LU, the management computer 140 executes this function. For example, it is conceivable that, when a lower LU of a virtual LU is a pair-S and already encrypted by a certain key, and further encryption is performed from the virtual LU, the data in the lower LU cannot be correctly decrypted. Control is performed by this function to prevent occurrence of such a situation.

The management computer 140 determines whether a lower LU of an LU to be encrypted is a pair-S (a copy-destination LU) or not (step 2401). This determination is performed similarly to the case of step 2204. If the LU is a pair-S, the management computer 140 ends the processing as an error (step 2402).

If the LU is not a pair-S (step 2401: No), the management computer 140 determines whether the lower LU of the LU is a virtual LU or not (step 2403). For example, in the example of FIG. 10, it is known that the LU 002 of A100 is a virtual LU, and its lower LU is the LU 1 of D600, from the items 1003, 1008 and 1010. Furthermore, it is known that the LU 1 of D600 (the lower LU) is an actual LU.

If the lower LU of the LU is a virtual LU (step 2403: Yes), the management computer 140 further repeats the processing from step 2401 for the lower LU of the LU (step 2404). If the lower LU of the LU is not a virtual LU, the management computer 140 ends the processing.

The virtual LU encryption possibility/impossibility determination function has been described above. Next, the LU encryption On processing function will be described.

<LU Encryption On Processing Function>

Figure 21:
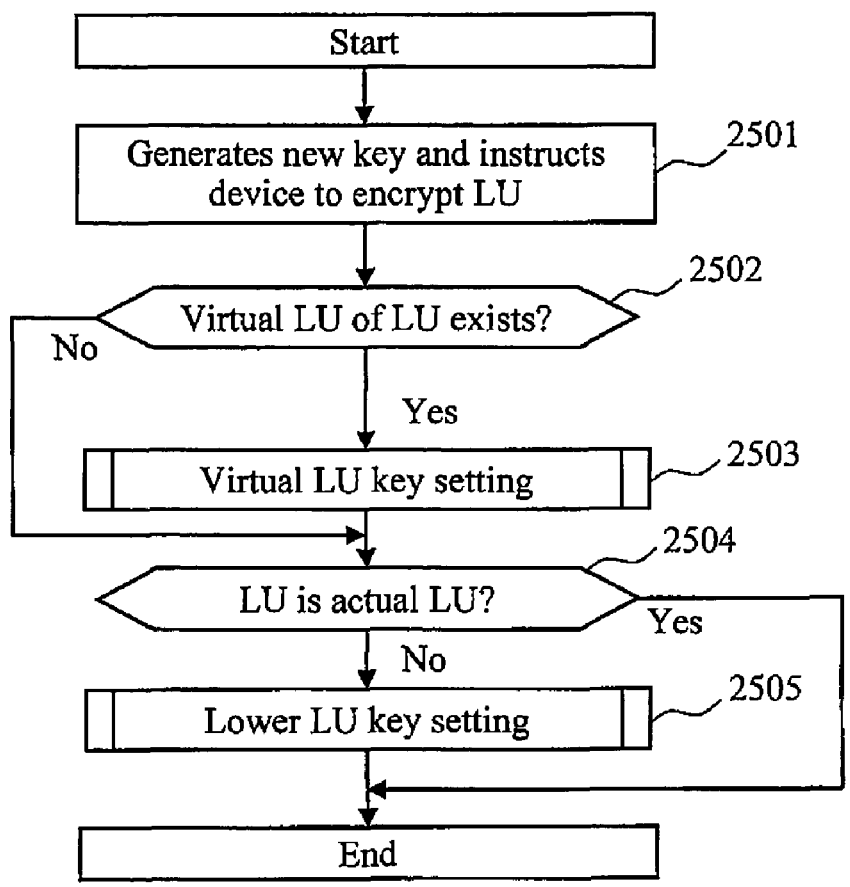
FIG. 21 is a flowchart for illustrating processing for the management computer 140 to execute an LU encryption On processing function in the first embodiment.

FIG. 21 is a flowchart for illustrating the processing contents of the LU encryption On processing function. In the case of encrypting an LU, the management computer 140 executes this function.

The management computer 140 instructs the storage device 120 or the encryption appliance 150 to generate a new key and encrypt the LU. The device which has received the instruction updates the LU management information and the key information (for example, updates the items 305, 306 and 601 to 604). The management computer 140 similarly updates the LU management information and key information of the management computer 140 (step 2501).

Then, the management computer 140 determines whether or not there is a virtual LU (a upper LU) of the LU to be encrypted (step 2502). If there is a virtual LU, the management computer 140 executes the virtual LU key setting function (step 2503), and advances the processing to step 2504. Whether there is a virtual LU or not is determined as follows. For example, in FIG. 10, it is checked whether there is description of the LU to be encrypted in the field of the item 1010. If the LU to be encrypted is written, the kind of the LU is checked by further referring to the item 1011. If "external connection" is set as the kind, it is determined that there is a virtual LU (the LU (item 1003) which has description like above under the items 1010 and 1011 is the virtual LU).

Furthermore, the management computer 140 determines whether the LU to be encrypted is an actual LU or not (step 2504). If the LU is an actual LU, the management computer 140 ends the processing. If the LU is not an actual LU, the management computer 140 determines that there is a lower LU and executes the lower LU key setting function (step 2505).

The above is the description of the LU encryption On processing function. Next, the lower LU key setting function will be described.

<Lower LU Key Setting Function>

Figure 22:
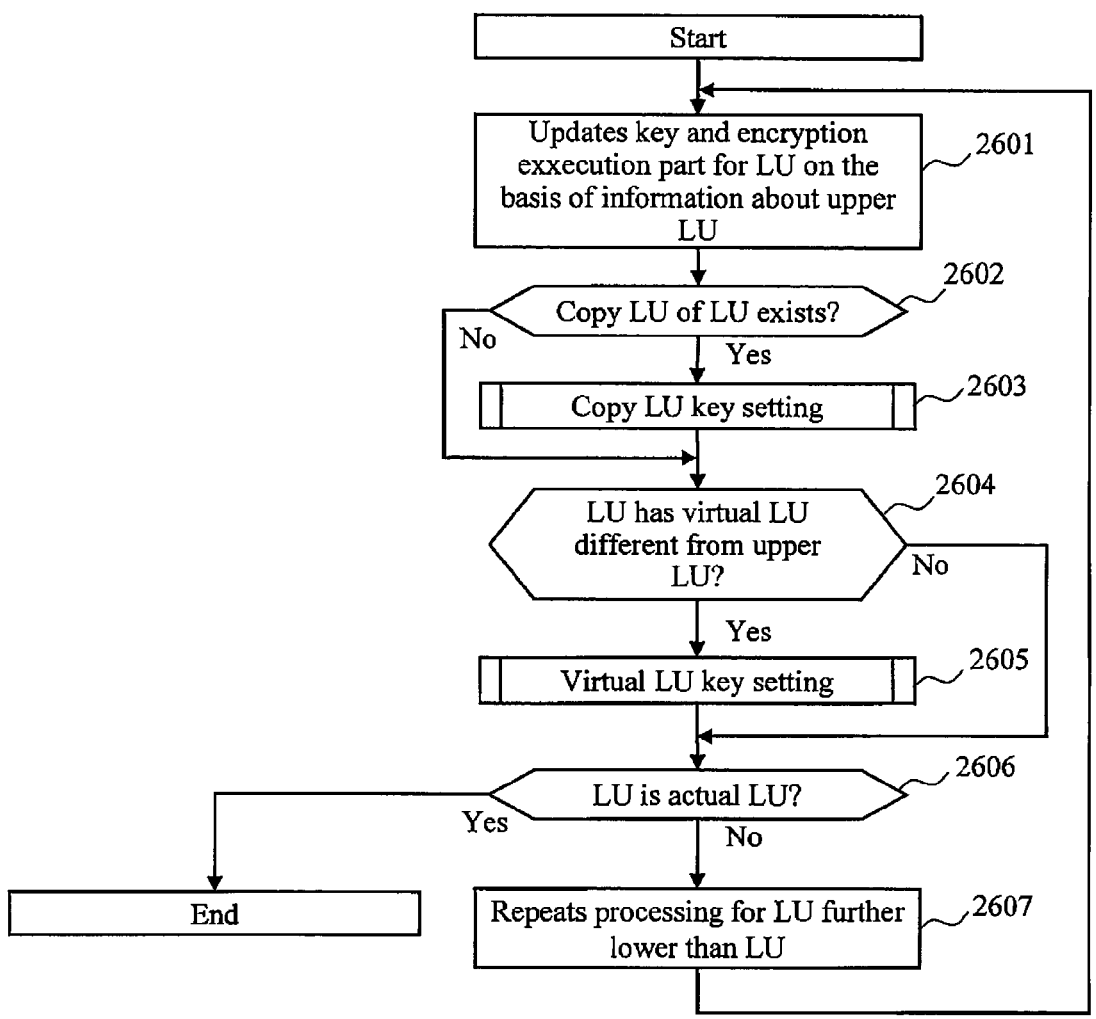
FIG. 22 is a flowchart for illustrating processing for the management computer 140 to execute a lower LU key setting function in the first embodiment.

FIG. 22 is a flowchart for illustrating the processing contents of the lower LU key setting function. The management computer 140 executes this function in the case of encrypting a virtual LU or in the case of giving a notification to set a key for a virtual LU which has been already encrypted but for which a key has not been set (for example, if data in an LU in the encrypted state is copied to an LU of a different storage device without being decrypted, the state of the LU of the different storage device is "ciphertext" but the key for the LU is not set in the different storage device) in the memory of the storage device 120 or the encryption appliance.

The management computer 140 updates the key, the information about whether encryption or plaintext, the information about encryption execution part and the like about a lower LU of a virtual LU to be encrypted, on the basis of the information about the virtual LU (step 2601). For example, if the LU 002 of the device A100 is encrypted in the example of FIG. 11, the state (item 1006) of the LU 1 of D600, which is a lower LU, also becomes "ciphertext", and the key ID (item 1007) also becomes the same as the key (A 100-1) for the LU 002 of the device A. The encryption execution part becomes "upper" because encryption has been performed in a upper LU. As for update of the encryption execution part for the lower LU, the encryption execution part for the lower LU becomes "upper" if the encryption execution part for the upper LU is "device itself" or "upper". A form is also possible in which, if "device itself" or "lower" is already set as the encryption execution part for the lower LU when the encryption execution part for the lower LU is updated, encryption execution part information "upper" is added instead of deleting the information already set.

Next, the management computer 140 determines whether or not there is a copy LU of the lower LU (step 2602). If there is a copy LU, the management computer 140 executes the copy LU key setting function to similarly set the key for the copy-destination LU (step 2603). If there is not a copy LU, the management computer 140 further determines whether or not the lower LU has a virtual LU different from the above virtual LU to be encrypted (step 2604).

If there is a different virtual LU, the management computer 140 executes the virtual LU key setting function for the different virtual LU (step 2605). If there is not a different virtual LU, the management computer 140 further determines whether the lower LU is an actual LU or not (step 2606). If the further lower LU is an actual LU, the management computer 140 ends the processing. If the further lower LU is not an actual LU (that is, the lower LU is a virtual LU), the processing from step 2601 is repeated for a lower LU of the lower LU (step 2607).

The lower LU key setting function has been described above. Next, the copy LU key setting function will be described.

<Copy LU Key Setting Function>

Figure 23:
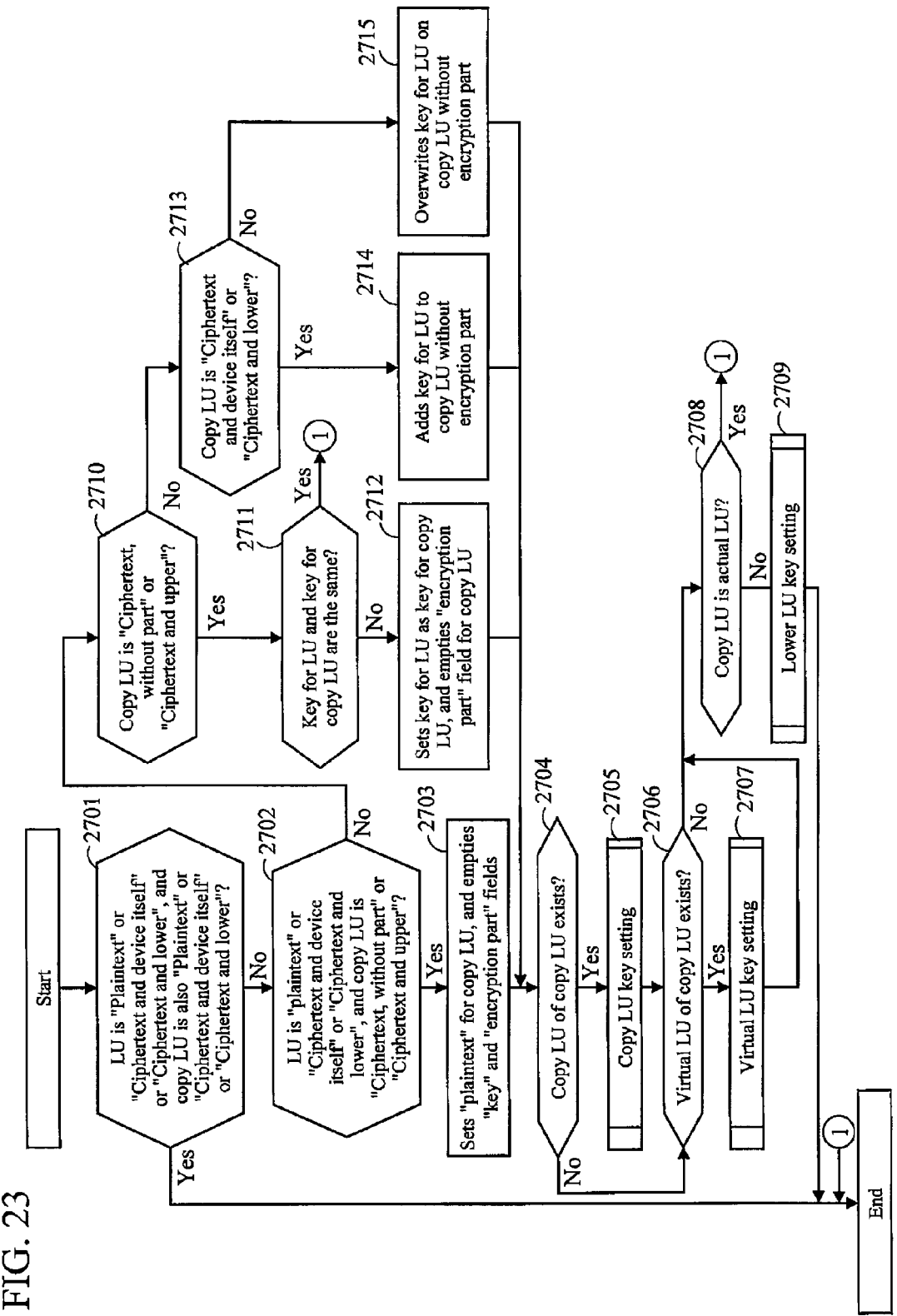
FIG. 23 is a flowchart for illustrating processing for the management computer 140 to execute a copy LU key set function in the first embodiment.

FIG. 23 is a flowchart for illustrating the processing contents of the copy LU key setting function. In the case of copying an LU, the management computer 140 executes this function. In this specification, an LU storing data copied from an LU is also called as a copy LU or a copy-destination LU. By executing this function, key information about the LU is also inherited to the copy LU.

The management computer 140 determines whether it is true or not that a copy-source LU is any of "plaintext", "ciphertext; encryption execution part: device itself" (that is, the state of the LU is "ciphertext" and the encryption execution part for the LU is "device itself") and "ciphertext; encryption execution part: lower", and the copy LU is also any of "plaintext", "ciphertext; encryption execution part: device itself" and "ciphertext; encryption execution part: lower" (step 2701). If the condition of step 2701 is satisfied, both of the states of the copy-source LU and the copy-destination LU are "plaintext" or the like, and it is not necessary to change the key. Therefore, the processing ends. If the condition of step 2701 is not satisfied, the management computer 140 further determines whether it is true or not that the copy-source LU is any of "plaintext", "ciphertext; encryption execution part: device itself" and "ciphertext; encryption execution part: lower", and the copy LU is any of "ciphertext; encryption execution part: without encryption execution part" (this means encryption execution part information (item 1009) of the LU is empty (space)) and "ciphertext; encryption execution part: upper" (step 2702). If the condition of step 2702 is satisfied, data from the copy-source LU is plaintext.

If the condition of step 2702 is satisfied, the management computer 140 sets "plaintext" as the state information (item 1006) about the copy LU, and empties the key (item 1007) and encryption execution part (item 1009) fields for the copy LU (step 2703).

Next, the management computer 140 determines whether there is a copy LU of the copy LU (an LU obtained by copying the copy LU) (step 2704). If there is a copy LU of the copy LU, the management computer 140 executes the copy LU key setting function for the LU (step 2705). If there is not a copy LU of the copy LU, the management computer 140 proceeds to step 2706.

After executing step 2705 (the copy LU key setting processing), the management computer 140 further determines whether there is a virtual LU of the copy LU (step 2706). If there is a virtual LU of the copy LU, the management computer 140 executes the virtual LU key setting function for the virtual LU (step 2707). If there is not a virtual LU of the copy LU, the management computer 140 advances the processing to step 2708.

After step 2707 or when the result is No at step 2706, the management computer 140 determines whether the copy LU is an actual LU (step 2708). If the copy LU is an actual LU, the management computer 140 ends the processing. If the copy LU is not an actual LU, the management computer 140 executes the lower LU key setting function for a lower LU of the copy LU and ends the processing (step 2709).

On the other hand, if the condition of step 2702 is not satisfied, the management computer 140 determines whether the copy LU is "ciphertext; encryption execution part: without encryption execution part" or "ciphertext; encryption execution part: upper" (step 2710). If the condition of step 2710 is satisfied, the management computer 140 determines whether the key for the LU and the key for the copy LU are the same (step 2711). If the condition of step 2710 is not satisfied, the management computer 140 determines whether the copy LU is "ciphertext; encryption execution part: device itself" or "ciphertext; encryption execution part: lower device" or not (step 2713). The processing of step 2713 is the same as determining whether the data read out from the copy LU to the external computer 100 is "plaintext" or not.

If the keys are the same at step 2711, the management computer 140 ends the processing. If the keys are not the same, the management computer 140 sets the key for the LU as the key for the copy LU (updates the item 1007 for the copy LU), empties the "encryption execution part" field for the copy LU, and advances the processing to step 2704 (step 2712).

If it is determined at step 2713 that the copy LU is neither "ciphertext; encryption execution part: device itself" nor "ciphertext; encryption execution part: lower", the management computer 140 sets the key for the LU as the key for the copy LU, with the encryption execution part for the copy LU empty (registers the same key as the key for the LU under the item 1007 for the copy LU and empties the item 1009 field for the copy LU), and moves the processing to step 2704 (step 2715).

On the other hand, if it is determined at step 2713 that the copy LU is "ciphertext; encryption execution part: device itself" or "ciphertext; encryption execution part: lower", the management computer 140 adds the key for the LU to the copy LU, without deleting the encryption execution part information already set before copying for the copy LU, and moves the processing to step 2704 (step 2714). That is, even if information about the key (item 1007) and the encryption execution part (item 1009) of the copy LU is already registered before copying, information is added to the items 1007 and 1009 while the above information is left as it is without being deleted. The reason is as follows. For example, in a situation in which encryption of data is performed by a copy-destination lower device, if data which has already been encrypted outside the device itself is copied, that is, if copied data which has been encrypted outside the device itself is encrypted again by a lower device, the data cannot be decrypted if the information about the key and the encryption execution part information already set for the copy LU is deleted.

The above is the description of the copy LU key setting function. Next, the virtual LU key setting function will be described.

<Virtual LU Key Setting Function>

Figure 24:
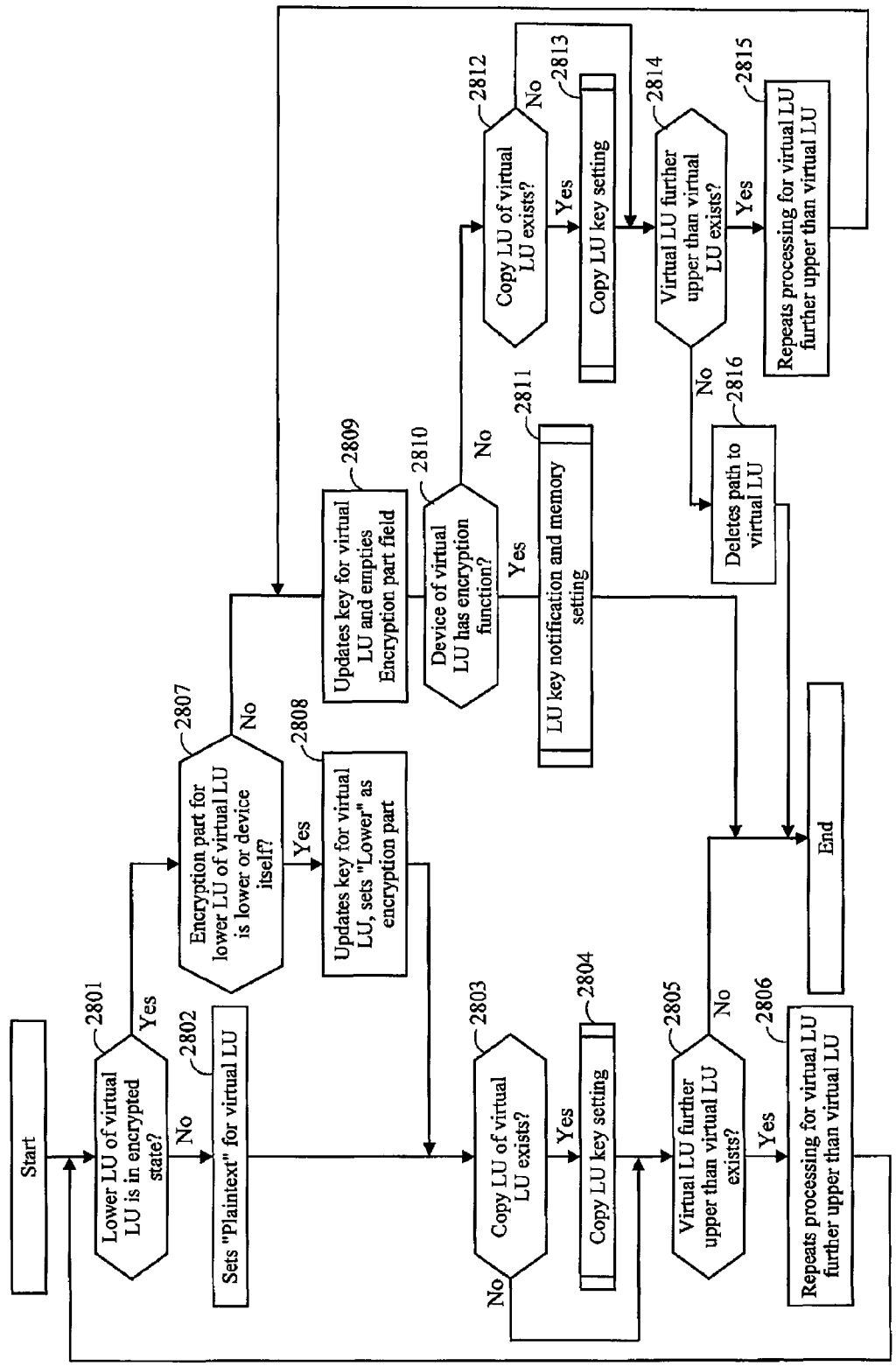
FIG. 24 is a flowchart for illustrating processing for the management computer 140 to execute a virtual LU key set function in the first embodiment.

FIG. 24 is a flowchart for illustrating the processing contents of the virtual LU key setting function. When having changed the key or the encryption execution part for a lower LU of a virtual LU, the management computer 140 executes this function to reflect the change on the virtual LU.

First, the management computer 140 determines whether or not "ciphertext" is set for a lower LU of a virtual LU (step 2801). If the state of the lower LU is not "ciphertext", the management computer 140 sets "plaintext" for the virtual LU (sets "plaintext" under the item 1006) (step 2802). If the state of the lower LU is "ciphertext", the processing moves to step 2807.

After step 2802, the management computer 140 determines whether or not there is a copy LU of the virtual LU (step 2803). If there is a copy LU of the virtual LU, the management computer 140 executes the copy LU key setting function, and advances the processing to step 2805 (step 2804). If there is not a copy LU of the virtual LU, the management computer 140 determines whether or not there is a further upper virtual LU virtualizing the virtual LU (step 2805).

If there is a further upper virtual LU, the management computer 140 repeats the processing from step 2801 for the further upper virtual LU (step 2806). If there is not a further upper virtual LU, the processing ends.

If the condition of step 2801 is satisfied, the management computer 140 further determines whether the encryption execution part for the lower LU of the virtual LU (for example, an LU of the external storage device) is "lower" or "device itself" (step 2807). If the condition of step 2807 is satisfied, the management computer 140 causes the key and state information for the virtual LU to be the same as the key and state information for the lower LU, sets "lower" as the encryption execution part for the virtual LU (updates 1006, 1007 and 1009) (step 2808), and advances the processing to step 2803. If the condition of step 2807 is not satisfied (in the case where the encryption execution part for the lower LU of the virtual LU is "lower" or shown in blank), the management computer 140 causes the key and state information about the virtual LU to be the same as the key and state information about the lower LU, and empties the "encryption execution part" field for the virtual LU (blanks the item 1009 field) (step 2809).

Next, the management computer 140 determines whether or not the device which holds the virtual LU is equipped with an encryption function (step 2810). If the device is equipped with an encryption function, the management computer 140 updates the encryption execution part for the virtual LU to "device itself" (updates the item 1009), executes the LU key notification and memory setting function for notifying the device which holds the virtual LU of the key for the virtual LU (the item 1007, and the items 1203 to 1205 as detailed information about the key) and instructing the device to set the key in the memory (updating the items 306, 601 to 604), and ends the processing (step 2811).

On the other hand, if the device which holds the virtual LU is not equipped with an encryption function, the management computer 140 further determines whether or not there is a copy LU of the virtual LU (step 2812). If there is a copy LU, the management computer 140 executes the copy LU key setting function, and advances the processing to step 2805 (step 2813). If there is not a copy LU, the management computer 140 determines whether or not there is a further upper virtual LU virtualizing the virtual LU (step 2814).

If it is determined at step 2814 that there is a further upper virtual LU, the management computer 140 repeats the processing from step 2809 for the further upper virtual LU (step 2815). If it is determined at step 2814 that there is not a further upper virtual LU, the management computer 140 notifies the device which holds the virtual LU to delete the path between the virtual LU and the computer 100 (the management computer 140 deletes the value of the item 1005 for the virtual LU, and the device which holds the virtual LU deletes the value of the item 304 for the virtual LU in response to the instruction from the management computer 140), and ends the processing (step 2816). That is, if a storage device 120 or encryption appliance 150 having an encryption function is not found among the virtual LU and related upper virtual LU's, the path to the processing target virtual LU is deleted. This is done to cut the path from the computer (host computer) 100 because the data of the virtual LU is read out still in the encrypted state and not decrypted. In such a case, it is also possible to provide a path to the host computer via the encryption appliance 150 instead of providing a path to the host computer directly from the storage device.

And, it is also possible that two or more encryption execution parts are written in the item 1009 for an LU (for example, in the case of further encrypting data which has already been encrypted outside the device itself, in the device itself, like step 2714 in FIG. 23). In such a case, this function is executed from step 2801 for each encryption execution part, and each execution result is reflected to a copy LU of a virtual LU of the LU and a further virtual LU of the virtual LU of the LU. That is, the two or more encryption execution parts are also written for these above LU's.

The virtual LU key setting function has been described above. The series of processings in the case where the management computer 140 enables encryption of an LU of a storage device has been shown by the above description.

Next, processing for the management computer 140 to control path setting for an LU of the storage device 120, the external storage device 130 or the encryption appliance 150 will be described.

<Processing for Management Computer 140 to Control Path Setting for LU>

Figure 25:
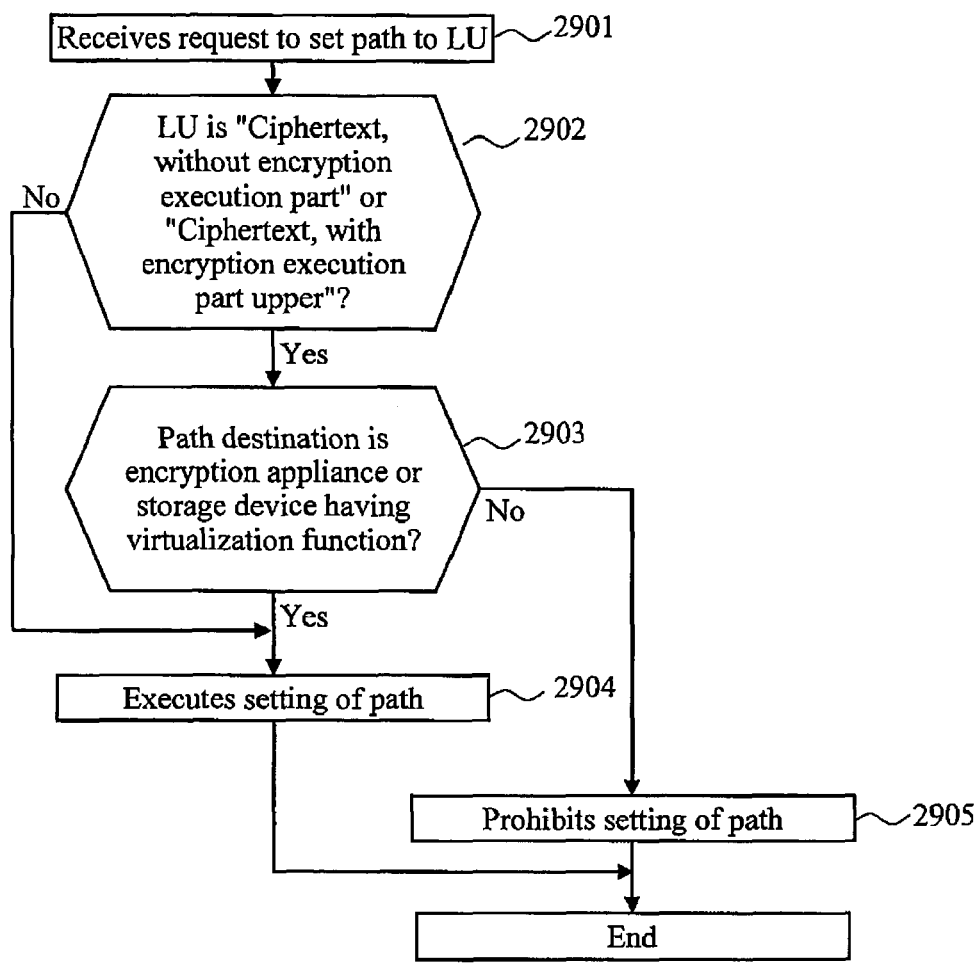
FIG. 25 is a flowchart for illustrating processing for the management computer 140 to control path setting for an LU in the first embodiment.

FIG. 25 is a flowchart for illustrating the contents of processing for controlling path setting for an LU of the storage device 120 or the like, which is executed by the path setting instruction program 226 of the management computer 140. By this processing, control is performed so as to prevent, for example, such a situation that the data of the LU in the encrypted state is presented to the computer 100 in ciphertext without being intended.

When receiving a request to set a path to an LU from a user (step 2901), the management computer 140 determines whether the LU is "ciphertext; encryption execution part: without encryption execution part" or "ciphertext; encryption execution part: upper" (step 2902). That is, at step 2902, it is determined whether, when data is outputted from the LU, the data is outputted in the ciphertext or not.

If the condition of step 2902 is not satisfied (if plaintext data is outputted from the LU), the management computer 140 permits and executes the requested path setting (the management computer registers, for example, the WWN of a computer permitted to access the LU under the item 1005 for the LU and updates the item 1005 for the LU, and the device which holds the LU similarly updates the item 304 for the LU in response to the path setting instruction from the management computer), and ends the processing (step 2904).

If the condition of step 2902 is satisfied (if encrypted data is outputted from the LU), the management computer 140 determines whether or not the device to which it is requested to set a path from the LU (when a path is provided from the LU to the path-destination device, the path-destination device can access the LU) is the encryption appliance 150 or the storage device 120 having an encryption function (step 2903).

If the condition of step 2903 is satisfied, the management computer 140 executes the path setting (step 2904). Otherwise, the management computer 140 prohibits the requested path setting or makes an alert notification or the like, and ends the processing (step 2905).

The above is the description of the processing for controlling path setting. Next, processing for the management computer 140 to instruct the storage device 120 or the encryption appliance 150 to execute virtualization of an LU will be described.

<Virtualization Instruction Processing by Management Computer 140>

Figure 26:
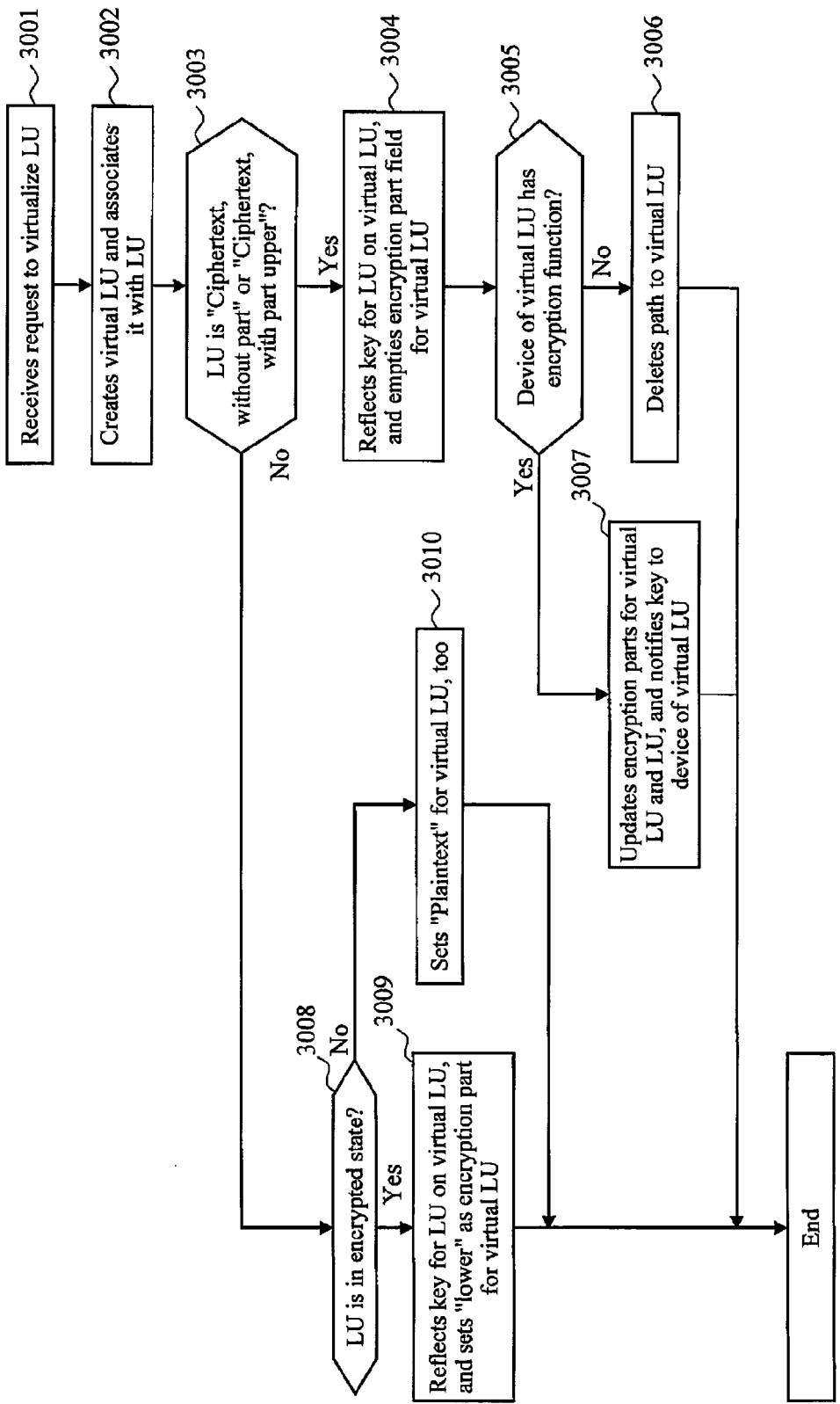
FIG. 26 is a flowchart for illustrating virtualization instruction processing by the management computer 140 in the first embodiment.

FIG. 26 is a flowchart for illustrating the contents of processing for instructing the storage device 120, the encryption appliance or the like to perform virtualization, which is executed by the storage management instruction program 225 of the management computer 140. By this processing, a virtual LU is created in the storage device 120 or the encryption appliance 150 or the like.

When receiving a request to virtualize an LU from a user (step 3001), the management computer 140 instructs the storage device 120 or the encryption appliance 150 to create a virtual LU (step 3002). More specifically, the management computer 140 adds an LU indicating a virtual LU to the item 1003, adds an LU to be virtualized (lower LU) to the item 1010 as a related LU, and also adds the kind of the lower LU to the item 1011. The storage device 120 adds the LU indicating a virtual LU to the item 302, similarly updates the items 308 and 309, and also updates the items 502 to 505 indicating the correspondence relationship between the virtual LU and the lower LU.

Next, the management computer 140 determines whether the LU is "ciphertext; encryption execution part: without encryption execution part" or "ciphertext; encryption execution part: upper" (step 3003). That is, it is determined whether data outputted from the LU is still in the encrypted state or not. If the condition of step 3003 is not satisfied (in the case output from the LU is plaintext data), the management computer 140 determines whether the LU to be virtualized (lower LU) is an LU in the encrypted state or not (step 3008). If the LU is determined to be an LU in the encrypted state, the management computer 140 causes the key and state information for the virtual LU to be the same values as the key and state information for the LU to be virtualized, sets "lower" as the encryption execution part for the virtual LU (updates the items 1006, 1007 and 1009) and ends the processing (step 3009). If it is determined at step 3008 that the LU to be virtualized is not an LU in the encrypted state, the management computer 140 sets "plaintext" for the virtual LU, updates the key and state information and the encryption execution part for the virtual LU, and ends the processing (step 3010).

On the other hand, if the condition of step 3003 is satisfied (if output from the LU is encrypted data), the management computer 140 causes the key and state information for the virtual LU to be the same as the key and state information for the LU to be virtualized, and sets the encryption execution part field for the virtual LU to be empty (step 3004). Here, the table in FIG. 11 is changed. Thereby, the management computer 140 can grasp the configuration and the state of the virtual LU.

Next, the management computer 140 determines whether or not the device which holds the virtual LU has an encryption function by referring to the item 1103 (step 3005). If it is determined that the device has an encryption function, the management computer 140 updates the encryption execution parts for the virtual LU and the LU, notifies the device to set the key in the memory, and ends the processing (step 3007). More specifically, the management computer 140 sets "device itself" as the encryption execution part for the virtual LU (encryption is performed in the virtual LU), and sets "upper" for the encryption execution part for the LU to be virtualized (encryption is performed in a virtual LU which is a upper LU of the LU to be virtualized). The management computer 140 also notifies the device of the key which is set at step 3004 for the virtual LU and requests the device to set the key in the memory (updates the items 306 and 601 to 604).

If it is determined at step 3005 that the device which holds the virtual LU is not equipped with an encryption function, the storage management instruction program 225 of the management computer 140 deletes the path between the computer and the virtual LU and ends the processing (step 3006). More specifically, the management computer 140 deletes the value of the item 1005 for the virtual LU, and the device which holds the virtual LU deletes the value of the item 304 for the virtual LU in response to an instruction from the management computer 140. This is done to prevent encrypted data from being outputted from the virtual LU as it is.

The above is the description of the virtualization instruction processing by the management computer 140.

Next, processing for the management computer 140 to create the LU management information 221 will be described. The LU management information 221 is basically generated by the management computer 140 updating the contents of the items 1001 to 1011 in accordance with the processings described above in response to an instruction of encryption, copying or the like of an LU. However, in the case of adding a new management computer 140 in a system in which encryption and key settings have been already made for the storage devices 120, the encryption appliance 150 and the like, the new management computer 140 is required to collect the information set for the storage devices 120 and the encryption appliance 150 and generate the LU management information. The LU management information creation processing will be described below.

<LU Management Information Creation Processing by Management Computer 140>

Figure 27:
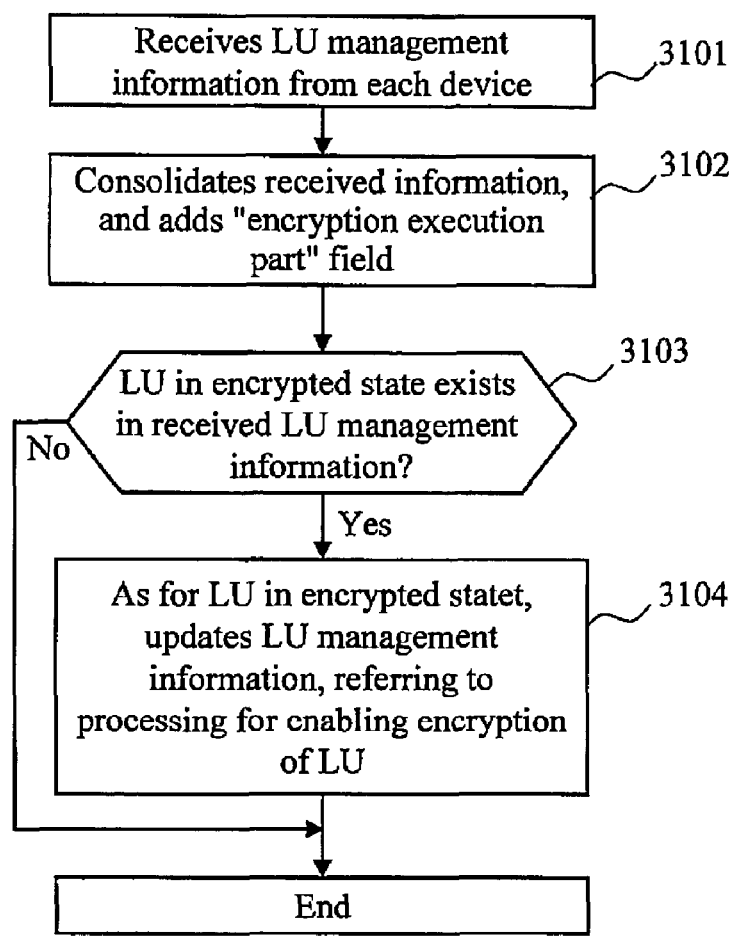
FIG. 27 is a flowchart for illustrating LU management information creation processing by the management computer 140 in the first embodiment.

FIG. 27 is a flowchart for illustrating the contents of processing for creating the LU management information 221, which is executed by the storage management instruction program 225 of the management computer 140.

The management computer 140 instructs each device to send the LU management information to the management computer 140 and receives the LU management information from each device (step 3101). For example, LU management information configured by the item 301 to item 309 is received from the storage devices 120.

Then, the management computer 140 consolidates the LU management information received from the devices and newly adds an encryption execution part field 1009 and a device name 1001 to create LU management information 221 configured by the items 1001 to 1011 (step 3102). Next, the management computer 140 determines whether there is an LU in the encrypted state in the LU management information received from each device (step 3103). For example, in the example of FIG. 3, the LU 000, the LU 001 and the LU 002 for which "ciphertext" is set under the item 305 are determined to be LU's in the encrypted state in the LU management information received from the storage device.

If it is determined that there is an LU in the encrypted state in the received LU management information, the management computer 140 updates, for each LU in the encrypted state, the LU management information 221 by referring to the processing for enabling encryption of an LU (see FIG. 21) and ends the processing (step 3104). In the LU encryption On processing (FIG. 21), when an LU is encrypted, the key, state and encryption execution part information about its virtual LU, lower LU and copy LU is also updated, and a key change notification is also made to storage devices 120 or encryption appliance 150 related to the updated LU. On the other hand, at step 3104, the key change notification is not made to the storage devices 120 or the encryption appliance 150, and only update of the LU management information (the values of the items 1001 to 1011) held by the management computer 140 is performed.

If it is determined at step 3103 that there is not an LU in the encrypted state in the received LU management information, the management computer 140 ends the processing.

Since the storage device 130 does not have an encryption function or a virtualization function, the state, the key ID and information indicating whether a virtual LU or an actual LU, for each LU, are not included in the LU management information in the example of FIG. 3(*b*). However, as for the LU management information received from the storage device 130, the management computer 140 may perform processing, considering each LU as an LU in the plaintext state, the key ID of each LU not to exist, and each LU as an actual LU, or it is also possible that the storage device 130 has LU management information (the items 301 to 309) similar to that of the storage device 120 in advance.

Since the encryption appliance 150 basically has only virtual LU's, information indicating a virtual LU/actual LU of each LU is not included in the LU management information 231 of the encryption appliance 150. However, as for the LU management information received from the encryption appliance 150, the management computer 140 may perform processing, considering each LU as a virtual LU, or it is also possible that the encryption appliance 150 has LU management information (the items 301 to 309) similar to that of the storage device 120 in advance.

The above is the description of the LU management information creation processing.

<Variation Example>

Processings other than these processings are also conceivable in the first embodiment. The other processings conceivable in the first embodiment will be described.

i) Rekey Processing

First processing according to a variation example is rekey processing for changing a key used for encryption of an LU. In the rekey processing, a storage device or an encryption appliance decrypts the data in an LU in the encrypted state once, re-encrypts the decrypted data with a new key, and stores the data into the LU. This rekey processing will be described. In the rekey processing, it is necessary to manage a key before rekeying and a key after rekeying. There is one key ID field in the examples in FIGS. 3 and 4. It is possible to manage the key before rekeying and the key after rekeying for each LU, for example, by providing two key ID fields.

The rekey processing can be described as processing similar to the processing for enabling encryption of an LU. Specifically, the management computer 140 instructs a storage device or an encryption appliance which has a specified LU to rekey the specified LU. Then, each of the management computer 140 and the instructed device updates its LU management information (adds the key after rekeying to the key ID field). The device instructed to perform rekeying decrypts the specified LU with the key before rekeying, re-encrypts the decrypted data with the key after rekeying, and store the data into the LU. The subsequent processing can be performed similarly to the processing for enabling encryption of an LU. That is, as for processing for updating the key and state information and the like about other LU's in connection with the rekeying of a specified LU (an LU for which rekeying has been instructed), the processing is performed similarly to the processing for enabling encryption of the specified LU using the key after rekeying. As for the key for rekeying, as in the processing for enabling encryption of the LU, it is possible to create the key at the device instructed to perform rekeying and notify the key to the management computer 140, or it is also possible to generate the key for rekeying on the management computer 140 side and transmitting it to the device instructed to perform rekeying. Though data which has been rekeyed and data which has not been rekeyed yet are temporarily mixed in the LU during rekeying, it is possible to perform rekeying without necessarily stopping read/write access from a computer, for example, by providing a pointer indicating to which address rekeying of data is finished. As the rekeying method, a transfer method (a method of creating a new LU and writing the data after rekeying into the new LU) is possible, in addition to the overwriting method (a method of writing the data after rekeying back to the same place in which the data before rekeying is stored). In the case of the transfer method, it is conceivable to create a new LU, set the key after rekeying for the new LU, and copy data from the LU which stores the data before rekeying to the newly created LU.

ii) Key Taking-Out Possibility/Impossibility Configuring Process

Second processing according to a variation example conceivable in the first embodiment will be described. As the second processing, it is conceivable to consider even the possibility/impossibility of taking out a key. For example, such an encryption device is conceivable that an encryption key cannot be taken out of the device which has generated the encryption key or can be taken out only into a medium such as an IC card for the reason of security. A method for key management processing in such a case will be described.

First, an item for key taking-out possibility/impossibility is added to the LU management information of the storage device, the encryption appliance and the management computer as a new item. In the case of a device which a key cannot be put into or taken out of, the device is considered "taking-out impossible". In the case of a device which a key can be put into or taken out of, the device is considered "taking-out possible". When encryption of an LU is enabled with the use of a "taking-out impossible" device, "impossible" is set in the taking-out possibility/impossibility field for the LU. Also as for an LU for which the key, state and encryption execution part information is updated in connection with encryption of the LU, "impossible" is set in the taking-out possibility/impossibility field. In the processing for enabling encryption of an LU, there may be a case where a key change notification is sent to related devices when encryption of a certain LU is enabled (such as the case of step 2301). However, if the LU is encrypted with the use of a product for which "impossible" is set in the taking-out possibility/impossibility field, it is not possible to notify the value of the key directly to the related devices. In such a case, information is notified which indicates, for example, which key used to encrypt which LU the key is the same as. For example, when the LU 1 of AP100 is encrypted with the use of a product (AP100) for which taking out of a key is disabled, the management computer 140 notifies the related devices of information that the key is the same as the key for the LU 1 of AP100. Receiving this, the devices update the LU management information of the devices for them to be able to understand that the key for the LU is the same as the key for the LU 1 of AP100. For example, AP100-LU1 is written under the key ID item in the LU management information, and AP100 is written in the encryption execution part field. When the LU management information of the management computer 140, the encryption appliance 150, the storage device 120 or the like is updated, information about what configuration change (for example, copying the LU 1 to the LU 2) has been made in the storage device is sent to an encryption executing part first (in the above example, information is sent to the encryption appliance AP 100 which is "taking-out impossible"), and cause the encryption executing part side to determine whether it is necessary or not to change the key. It is determined that the change of the key is unnecessary if the key for the copy-source LU and the key for the copy-destination LU are the same, and it is determined that the change of the key is necessary if the keys are different from each other. In the case where it is determined that the change is necessary, processing for updating the LU management information may be performed (for example, in the case where the LU 1 and the LU 2 are LU's of the storage device and both of them are encrypted with the use of AP100, AP100 can grasp the keys of the LU 1 and the LU 2 though the management computer cannot grasp them. Therefore, AP100 can determine whether it is necessary to change the key when the LU 1 is copied to the LU 2 (if the same key is originally set for the LU 1 and the LU 2, it is not necessary to change the key even if copying is performed; but, if different keys are set, it is necessary to change the key for the LU 2 so that it becomes the same as the key for the LU 1)).

(2) Second Embodiment

Since the configuration of a computer system (storage system) of a second embodiment is the same as the configuration of the first embodiment, description thereof is omitted.

In this embodiment, when the storage device 120 virtualizes an LU of a different storage device, it selects and virtualizes a different LU according to whether it attaches importance to performance or it attaches importance to security. Which LU the storage device 120 virtualizes is controlled by the management computer 140. Since it is conceivable that encryption of data increases the load on the storage device, it is also conceivable not to perform encryption of data when importance is attached to performance such as processing speed. This embodiment is for adjusting the balance between performance and security. The processing of this embodiment will be described below.

Figure 28:
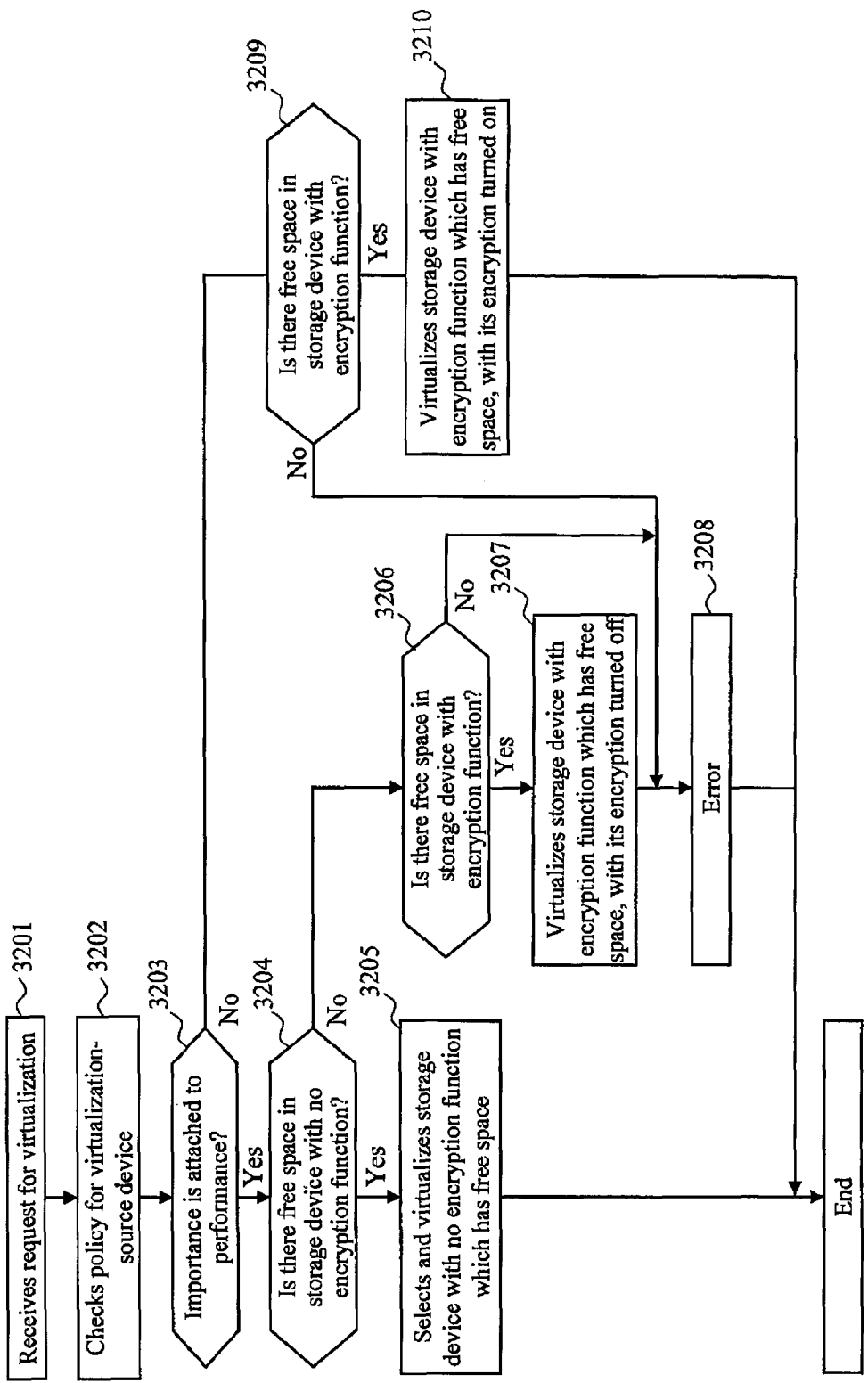
FIG. 28 is a flowchart for illustrating processing in a second embodiment.

FIG. 28 is a flowchart for illustrating processing according to the second embodiment (virtualization processing). This processing is executed by the management computer 140 and the storage device 120 cooperating with each other.

First, when the management computer 140 receives a request to virtualize an LU from a user, the processing starts (step 3201). This is, for example, the case where the user requests the management computer 140 to create a new virtual LU in the storage device 120.

Next, the management computer 140 refers to the items 1301 and 1302 to check the policy of a virtualization-source device (for example, in the case of creating a new virtual LU in the storage device 120, the storage device 120 is the virtualization-source device) (step 3202). If it is confirmed that the policy is "attaching importance to performance" (step 3203), the management computer 140 further determines whether there is a storage device which is not equipped with an encryption function and which has free space (step 3204). Whether each device has an encryption function or not is determined by referring to the item 1103, and whether there is free space or not is determined by referring to the item 1004 or by separately managing information about how much free space is left relative to the whole capacity.

If it is determined at step 3204 that there is free space, the management computer 140 selects an LU of the storage device which is not equipped with an encryption function, notifies the virtualization-source device to virtualize the LU and ends the processing (step 3205).

If it is determined at step 3204 that there is not an appropriate storage device, the management computer 140 determines whether there is a storage device which is equipped with an encryption function and which has free space (step 3206). If it is determined at step 3206 that there is free space, the management computer 140 selects an LU of the storage device equipped with an encryption function, notifies the storage device equipped with an encryption function to disable encryption of the LU, notifies the virtualization-source device to virtualize the LU and ends the processing (step 3207).

If it is determined at step 3206 that there is not an appropriate storage device, the management computer 140 determines an error and ends the processing (step 3208).

On the other hand, if it is confirmed at step 3203 that importance is attached not to performance but to security, the management computer 140 determines whether there is a storage device which is equipped with an encryption function and which has free space (step 3209). If there is free space, the management computer 140 selects an LU of the storage device equipped with an encryption function, notifies the storage device equipped with an encryption function to enable encryption of the LU, notifies the virtualization-source device to virtualize the LU and ends the processing (step 3210).

If it is determined at step 3209 that there is not an appropriate storage device, the management computer 140 determines an error and ends the processing (step 3208). At step 3210, it is possible for the virtualization-source device itself to encrypt the virtual LU as well as it is possible for the storage device equipped with an encryption function (the storage device having the LU to be virtualized) to perform encryption.

The above is the description of the processing of the second embodiment.

(3) Summary

In these embodiments, for example, the case will be considered in which a first storage area of an external storage device is virtualized as a first virtual storage area of a first storage device and encrypted with a first encryption key, and a second storage area of the external storage device is virtualized as a second virtual storage area of the first storage device and encrypted with a second encryption key. In this case, a management computer manages information about a key and an encryption execution section for each storage area of the external storage device. The encryption execution section (encryption execution part) is a place where encryption of a storage area of the external storage is performed, and it is, for example, the first storage device, an encryption appliance product or the like. In the case of copying a storage area of the external storage device, the management computer determines whether or not it is necessary to change the key for the storage area when the operation is performed. If it is necessary to change the key, the management computer instructs the encryption execution section to change the key. For example, in the case of copying the first storage area of the external storage device to the second storage area, the management computer compares the first encryption key used for encryption of the first storage area and the second encryption key used for encryption of the second storage area. If the two keys are different from each other, the management computer determines that it is necessary to change the key in the encryption execution section. Then, the management computer notifies the encryption execution section to change the key used for encryption of the second storage area from the second key to the first key. The management computer also manages the key and encryption execution section information for each storage area of the first storage device. In the case of changing or deleting the key for a certain storage area in the storage system (computer system), the management computer identifies storage areas for which it is accompanyingly necessary to change or delete the key, and instructs the encryption execution sections which perform encryption of the storage areas to change or delete the key. Thereby, even in an environment in which there are various encryption execution sections, it is possible to appropriately manage encryption keys and correctly decrypt an encrypted storage area.

Furthermore, as for a storage area which an encryption execution section does not directly encrypt/decrypt for writing/reading, for example, a storage area obtained by copying a storage area in the encrypted state to a different storage area in ciphertext also, the management computer manages information about the encryption key and the encryption execution section so that the storage area can be correctly decrypted.

Furthermore, in the case of providing an encrypted storage area for a computer, if an administrator attempts to set a path to provide the storage area directly to the computer not via an encryption execution section, the management computer makes an alert notification that a path should be set via the encryption execution section so that the storage area can be correctly decrypted. Thereby, it is possible to avoid such inappropriate setting of a path that data which remains encrypted is provided for a computer (host computer).

In the case where it is instructed to set a new encryption key for a storage area, the management computer updates management information (information for managing the encryption key and the encryption execution part) about the target storage area. At the same time, if a virtualized storage area and/or a lower storage area of the target storage area exists, the management computer updates management information about the storage area, and instructs the encryption/decryption processing section of the storage device and the encryption appliance to perform encryption and decryption on the basis of the updated management information. Thereby, even if the encryption key for a certain storage area is changed, it is possible to appropriately execute encryption and decryption processing not only in the storage area but also in its related upper and lower storage areas.

When receiving a request for virtualization and associating a virtualized storage area with a target storage area, the management computer determines whether or not plaintext data is outputted from the target storage area. In the case where plaintext data is outputted, it is determined whether or not to reflect the encryption key for the target storage area on the virtualized storage area, depending on whether or not the state of the target storage area is the ciphertext state. On the other hand, if encrypted data is outputted from the target storage area, the management computer further determines whether or not the device which the virtualized storage area belongs to has an encryption function. If the device does not have an encryption function, the path between the virtualized storage area and the computer 100 is deleted. If the device has an encryption function, the encryption execution part (a place where encryption is executed) for the virtualized area is set to "device itself" (the virtualized storage area concerned), and the encryption execution part for the target storage area is set to "upper" (this means that encryption is executed in the virtualized storage area which is upper than the target storage area) in the management information. Thereby, it is possible to appropriately realize virtualization according to the encryption state and the encryption execution part for the storage area. That is, though there is a possibility that encrypted data or encrypted data for which the encryption key is not known is provided for a computer (host computer) only by simply performing virtualization, it becomes possible to avoid such a situation.

The management computer further manages information about whether an encryption key set for a storage area can be taken out or not, in the management information. If execution of copying processing of data in a storage area for which the encryption key cannot be taken out is instructed, the management computer notifies the storage device or the encryption appliance which performs encryption of the data in the storage area for which the encryption key cannot be taken out, of alternative key information indicating which encryption key having encrypted which data in which storage area, among different storage areas, the encryption key used to encrypt the data in the storage area of the copy destination is the same as. The storage device or the encryption appliance executes encryption and decryption processing on the basis of the alternative key information. Thereby, even in the case where it is prohibited to take out an encryption key for the purpose of security, it becomes possible to appropriately decrypt encrypted data in a relevant storage area and provide it for the computer.

The management computer further manages policy information indicating whether the storage device is a device attaching importance to security or a device attaching importance to performance. When receiving a request for virtualization and associating a virtualized storage area with a target storage area, the management computer may refer to the policy information to realize virtualization. Thereby, it becomes possible to realize operation according to the characteristics of a storage device.

The embodiments have been described above. However, the present invention is not limited to the embodiments at all, and it goes without saying that the present invention can be practiced in various embodiments within the range not departing from the spirit of the present invention.

The present invention can be also realized by a program code of software for realizing the functions of the embodiments. In this case, a storage medium in which the program code is recorded is provided for a system or an apparatus, and the computer (or the CPU or the MPU) of the system or the apparatus reads the program code stored in the storage medium. In this case, the program code itself read from the storage medium realizes the functions of the embodiments described before, and the program code itself and the storage medium storing it constitute the present invention. As the storage medium for providing the program code, for example, a flexible disk, CD-ROM, DVD-ROM, hard disk, optical disk, magneto-optical disk, CD-R, magnetic tape, non-volatile memory card and ROM are used.

It is also possible that an OS (operating system) or the like operating on the computer performs all or a part of actual processing, and the functions of the embodiments described before are realized by the processing. Furthermore, it is also possible that, after the program code read from the storage medium is written into a memory on the computer, the CPU or the like of the computer performs all or a part of actual processing on the basis of instructions of the program code, and the functions of the embodiments described before are realized by the processing.

Furthermore, it is also possible that the program code of the software for realizing the functions of the embodiments are distributed via a network so that it is stored in storage means such as a hard disk and a memory of a system or an apparatus, or a storage medium such as a CD-RW and a CD-R, and the computer (or the CPU or the MPU) of the system or the apparatus reads and executes the program code stored in the storage means or the storage medium when it is used.

REFERENCE SIGNS LIST

100 . . . computer
101, 122, 132, 141, 151 . . . CPU
102, 142, 152 . . . memory
103, 121, 131, 154 . . . FC I/F
104, 111, 126, 136, 143, 153 . . . management I/F
110 . . . FC switch
120, 120a, 120b . . . storage device
123, 133 . . . cache memory
124, 134 . . . control memory
125, 135 . . . storage area
130 . . . external storage device
140 . . . management computer
150 . . . encryption appliance
201, 211, 221, 231 . . . LU management information
203, 233 . . . external storage information
202, 212, 222, 232 . . . device information
204, 223, 234 . . . key information
224 . . . policy information
205, 213, 235 . . . I/O processing program
208, 238 . . . encryption setting program
206, 214 . . . storage management program
207, 215, 237 . . . path setting program
236 . . . copy program
225 . . . storage management instruction program
226 . . . path setting instruction program
227 . . . encryption setting instruction program
228 . . . policy setting program

The invention claimed is:

1. A storage system comprising:
a storage device which includes multiple storage areas for storing data, an encryption/decryption processing section which encrypts data stored in the storage areas and decrypts the encrypted data, and a management computer which manages the operation of the storage device and the encryption/decryption processing section; wherein
the management computer manages management information which includes state information indicating whether stored data is encrypted or not, information about an encryption key used for encryption of data to be stored and encryption execution part information, for each of the multiple storage areas, wherein the encryption execution part information indicates where data is encrypted, among a storage area of the device itself, a storage area upper than the device itself, a storage area lower than the device itself, and a storage area which does not have an upper or lower relationship with the device itself;
the storage device also has a copy processing section which copies the data in a first storage area to a second storage area;
before the copy function by the copy processing section is set, the encryption/decryption processing section encrypts and decrypts the data stored in the first storage area with a first encryption key, and encrypts and decrypts the data stored in the second storage area with a second encryption key; and
if the copy function by the copy processing section is set, the management computer updates the encryption key information in the management information about the second storage area from the second encryption key to the first encryption key, determines based on the management information whether or not the copy function is performed by the encryption/decryption processing section which encrypts and decrypts the first storage area, and if the copy function is performed by a different device from the encryption/decryption processing section which encrypts and decrypts the first storage area, instructs the encryption/decryption processing section to decrypt the data copied to the second storage area with the first encryption key.

2. The storage system according to claim 1, wherein i) when the data in the first storage area is copied to the second storage area, the management computer sets information meaning that the data is encrypted in a storage area which does not have a upper or lower relationship with the device itself, as the encryption execution part information in the management information about the second storage area; ii) when it is instructed to set a new encryption key for a storage area, the management computer updates the management information about the target storage area, and, if a virtualized storage area and/or a lower storage area of the target storage area exists, the management computer updates the management information about the storage areas if necessary and instructs the encryption/decryption processing section to perform encryption and decryption on the basis of the updated management information; iii) when it is requested to set a path between a storage area and a host computer, and the path is such that data to be provided for the host computer is plaintext data, the management computer executes setting of the path; iv) when receiving a request for virtualization and associating a virtualized storage area with a target storage area, the management computer determines whether or not to reflect the encryption key for the target storage area to the virtualized storage area depending on whether or not the state of the target storage area is a ciphertext state, in the case where plaintext data is outputted from the target storage area; and the management computer further determines whether or not the device which the virtualized storage area belongs to has an encryption function, in the case where encrypted data is outputted from the target storage area, deletes the path between the virtualized storage area and the host computer if the device does not have the encryption function, and sets information as the encryption execution part information for the virtualized area, and information (upper) as the encryption execution part information for the target storage area if the device has the encryption function.

3. The storage system according to claim 1, further comprising an external storage device separately from the storage device; wherein the storage device has first and second virtual storage areas, and the first and second virtual storage areas are associated with first and second lower storage areas, which are storage areas of the external storage device, respectively; the external storage device has a copy processing section that copies data in the first lower storage area to the second lower storage area; before the function of copying the data in the first lower storage area to the second lower storage area is set by the copy processing section, the encryption/decryption processing section encrypts and decrypts the data stored in the first lower storage area with the first encryption key, and encrypts and decrypts data stored in the second lower storage area with the second encryption key; and if the function of copying to the second lower storage area is set, the management computer updates the encryption key information in the management information about the second lower storage area from the second encryption key to the first encryption key, and instructs the encryption/decryption processing section to decrypt the data copied to the second lower storage area with the first encryption key.

4. The storage system according to claim 1, wherein the encryption/decryption processing section is provided in an encryption appliance connected to the management computer and the storage device via a network; and the encryption appliance has first and second virtual storage areas corresponding to the first and second virtual storage areas in the storage device, respectively.

5. The storage system according to claim 1, wherein when the data in the first storage area is copied to the second storage area, the management computer sets information meaning that the data is encrypted in a storage area which does not have an upper or lower relationship with the device itself, as the encryption execution part information in the management information about the second storage area.

6. The storage system according to claim 1, wherein when it is instructed to set a new encryption key for a storage area, the management computer updates the management information about the target storage area, and, if a virtualized storage area and/or a lower storage area of the target storage area exists, the management computer updates the management information about the storage areas if necessary and instructs the encryption/decryption processing section to perform encryption and decryption on the basis of the updated management information.

7. The storage system according to claim 1, wherein when processing a request to set a path between a storage area and a host computer, the management computer executes setting of the path if the path setting requirement is such that data to be provided for the host computer is plaintext data.

8. The storage system according to claim 1, wherein when receiving a request for virtualization and associating a virtualized storage area with a target storage area, the management computer determines whether plaintext data is outputted from the target storage area; and, if plaintext data is outputted, the management computer determines whether or not to reflect the encryption key for the target storage area to the virtualized storage area depending on whether or not the state of the target storage area is a ciphertext state.

9. The storage system according to claim 8, wherein the management computer further determines whether or not the device which the virtualized storage area belongs to has an encryption function, in the case where encrypted data is outputted from the target storage area, deletes the path between the virtualized storage area and the host computer if the device does not have the encryption function, and sets information as the encryption execution part information for the virtualized area, and information as the encryption execution part information for the target storage area if the device has the encryption function.

10. The storage system according to claim 1, wherein the management computer further manages information about possibility/impossibility of taking out an encryption key set for a storage area, in the management information; if execution of copying processing of data in a storage area from which the encryption key cannot be taken out is instructed, the management computer notifies the encryption/decryption processing section which performs encryption of the data in the storage area from which the encryption key cannot be taken out, of alternative key information indicating which encryption key used to encrypt which data in which storage area, the encryption key used to encrypt the data in the storage area of the copy destination is the same as; and controls the encryption/decryption processing section to execute encryption and decryption processing on the basis of the alternative key information.

11. The storage system according to claim 1, wherein the management computer further manages policy information indicating whether the storage device is a device attaching importance to security or a device attaching importance to performance; and when receiving a request for virtualization and associating a virtualized storage area with a target storage area, the management computer refers to the policy information to realize virtualization.

12. The storage system according to claim 11, wherein if the storage device is a device attaching importance to security, the management computer enables the encryption function and realizes the virtualization if there is free space; and if the storage device is a device attaching importance to performance, the management computer realizes the virtualization in a manner that the encryption function does not operate.

13. A method for controlling a storage system, wherein the storage system comprises:

a storage device which includes multiple storage areas for storing data, an encryption/decryption processing section which encrypts data stored in the storage areas and decrypts the encrypted data, and a management computer which manages the operation of the storage device and the encryption/decryption processing section; wherein the management computer manages management information which includes state information indicating whether stored data is encrypted or not, information about a key used for encryption of data to be stored and encryption execution part information, for each of the multiple storage areas, wherein the encryption execution part information indicates where data is encrypted, among a storage area of the device itself, a storage area upper than the device itself, a storage area lower than the device itself, and a storage area which does not have an upper or lower relationship with the device itself;

the storage device also has a copy processing section which copies the data in a first storage area to a second storage area;

and in the control method, before the copy function by the copy processing section is set, the encryption/decryption processing section encrypts and decrypts the data stored in the first storage area with a first encryption key, and encrypts and decrypts the data stored in the second storage area with a second encryption key; and if the copy function by the copy processing section is set, the management computer updates the encryption key information in the management information about the second area from the second encryption key to the first encryption key, determines based on the management information whether or not the copy function is performed by the encryption/decryption processing section which encrypts and decrypts the first storage area, if the copy function is performed by a different device from the encryption/decryption processing section which encrypts and decrypts the first storage area, and instructs the encryption/decryption processing section to decrypt the data copied to the second storage area with the first encryption key.

14. The control method according to claim 13, wherein i) when the data in the first storage area is copied to the second storage area, the management computer sets information meaning that the data is encrypted in a storage area which does not have an upper or lower relationship with the device itself, as the encryption execution part information in the management information about the second storage area; ii) when it is instructed to set a new encryption key for a storage area, the management computer updates the management information about the target storage area, and, if a virtualized storage area and/or a lower storage area of the target storage area exists, the management computer updates the management information about the storage areas if necessary and instructs the encryption/decryption processing section to perform encryption and decryption on the basis of the updated management information; iii) when it is requested to set a path between a storage area and a host computer, and the path is such that data to be provided for the host computer is plaintext data, the management computer executes setting of the path; iv) when receiving a request for virtualization and associating a virtualized storage area with a target storage area, the management computer determines whether or not to reflect the encryption key for the target storage area to the virtualized storage area depending on whether or not the state of the target storage area is a ciphertext state, in the case where plaintext data is outputted from the target storage area; and the management computer further determines whether or not the device which the virtualized storage area belongs to has an encryption function, in the case where encrypted data is outputted from the target storage area, deletes the path between the virtualized storage area and the host computer if the device does not have the encryption function, and sets information as the encryption execution part information for the virtualized area, and information as the encryption execution part information for the target storage area if the device has the encryption function.

15. A non-transitory computer readable medium storing a program for controlling a storage system, wherein the storage system comprises: a storage device which includes multiple storage areas for storing data, an encryption/decryption processing section which encrypts data stored in the storage areas and decrypts the encrypted data, and a management computer which manages the operation of the storage device and the encryption/decryption processing section;

the management computer manages management information which includes state information indicating whether stored data is encrypted or not, information about a key used for encryption of data to be stored and encryption execution part information, for each of the multiple storage areas, wherein the encryption execution part information indicates where data is encrypted, among a storage area of the device itself, a storage area upper than the device itself, a storage area lower than the device itself, and a storage area which does not have an upper or lower relationship with the device itself;

the storage device also has a copy processing section which copies the data in a first storage area to a second storage area; wherein the program, when executed by a computer performs a method comprising:

before the copy function by the copy processing section is set, the encryption/decryption processing section encrypts and decrypts the data stored in the first storage area with a first encryption key, and encrypts and decrypts the data stored in the second storage area with a second encryption key; and if the copy function by the copy processing section is set, the management computer updates the encryption key information in the management information about the second area from the second encryption key to the first encryption key, determines based on the management information whether or not the copy function is performed by the encryption/decryption processing section which encrypts and decrypts the first storage area, if the copy function is performed by a different device from the encryption/decryption processing section which encrypts and decrypts the first storage area, and instructs the encryption/decryption processing section to decrypt the data copied to the second storage area with the first encryption key.

* * * * *